United States Patent [19]

Lefkowitz et al.

[11] Patent Number: 5,408,407

[45] Date of Patent: Apr. 18, 1995

[54] SYSTEM AND METHOD FOR POSITIONING A WORK POINT

[75] Inventors: Sheldon Lefkowitz, Sewickley; Donald M. Youngwirth, Jefferson Boro, both of Pa.; Gerald E. Gore, North Branch; Harry T. Roman, East Orange, both of N.J.

[73] Assignee: Pentek, Inc., Corapolis, Pa.

[21] Appl. No.: 34,800

[22] Filed: Mar. 15, 1993

[51] Int. Cl.⁶ .................. G06F 15/20; G05D 3/00
[52] U.S. Cl. .................. 364/167.01; 254/278; 364/478
[58] Field of Search .................. 364/167.01, 478, 174, 364/505, 559; 254/264, 265, 276, 280–284, 362, 285, 337, 398, 399, 278; 212/148, 153, 149; 901/21, 43; 318/3–9, 575, 625

[56] References Cited

U.S. PATENT DOCUMENTS

| | | |
|---|---|---|
| 498,721 | 5/1893 | McKay . |
| 526,263 | 9/1894 | Rosenfeld . |
| 597,022 | 1/1898 | Rice . |
| 773,000 | 10/1904 | Canfield . |
| 812,952 | 2/1906 | Sayer . |
| 2,361,053 | 10/1944 | Pedersen et al. ............ 212/3 |
| 2,799,403 | 7/1957 | Friedman ............ 212/83 |
| 3,001,651 | 9/1961 | Fekete et al. ............ 214/1 |
| 3,332,716 | 7/1967 | Gridley ............ 294/67 |
| 3,437,223 | 4/1969 | Haase ............ 214/730 |
| 3,481,493 | 12/1969 | Wälischmiller ............ 214/1 |
| 3,589,134 | 6/1971 | Hackman ............ 61/96 R |
| 3,780,571 | 12/1973 | Weisener ............ 73/67.8 S |
| 3,817,348 | 6/1974 | Jones ............ 182/142 |
| 3,826,380 | 7/1974 | Lenander et al. ............ 212/125 |
| 3,973,680 | 8/1976 | Van der Lely et al. ............ 212/76 |
| 4,112,535 | 9/1978 | Wild et al. ............ 15/98 |
| 4,200,052 | 4/1980 | Cunningham et al. ......... 254/276 X |
| 4,220,170 | 9/1980 | Hebert et al. ............ 134/167 |
| 4,232,636 | 11/1980 | Prohazka ............ 122/479 |
| 4,286,417 | 9/1981 | Shelton ............ 51/415 |
| 4,436,694 | 3/1984 | Vassalotti et al. ............ 376/310 |
| 4,470,952 | 9/1984 | Vassalotti ............ 376/316 |
| 4,474,497 | 10/1984 | Sullivan ............ 432/76 |
| 4,496,519 | 1/1985 | McGuire ............ 376/316 |
| 4,526,311 | 7/1985 | Schröder ............ 228/119 |
| 4,535,727 | 8/1985 | Ziegler ............ 122/32 |
| 4,545,017 | 10/1985 | Richardson ............ 364/565 X |
| 4,594,774 | 6/1986 | Barker et al. ............ 29/723 |
| 4,595,419 | 1/1986 | Patenaude ............ 134/1 |
| 4,636,962 | 1/1987 | Broyden et al. ............ 212/149 X |
| 4,639,351 | 1/1987 | Förner et al. ............ 376/310 |
| 4,759,674 | 7/1988 | Schröder et al. ............ 414/146 |
| 4,762,455 | 8/1988 | Coughlan et al. ............ 414/4 |
| 4,883,184 | 11/1989 | Albus ............ 212/146 |
| 4,905,848 | 3/1990 | Skjonberg ............ 212/153 X |
| 4,932,606 | 6/1990 | Conn ............ 244/33 |
| 4,979,093 | 12/1990 | Laine et al. ............ 364/167.01 |

OTHER PUBLICATIONS

"Robots to Support Radioactive Waste Activities: Task Analysis, Conceptual Design, and Commercial Evaluation," EPRI NP-6390 Project 2232-13 Interim Report, Jun. 1989.

Higdon et al-*Engineering Mechanics*, pp. 229–230, Prentice-Hall, (1949).

*Primary Examiner*—Joseph Ruggiero
*Attorney, Agent, or Firm*—Fitzpatrick, Cella, Harper & Scinto

[57] ABSTRACT

A system for positioning a work point has a plurality of reeving systems spaced apart from one another, with each reeving system having a adjustable support element connected to it. These support elements are also connected to the work point, with the length of the support elements between the work point and the reeving determining the work point's location. Associated with each reeving system is an actuator adapted for releasing and taking up the support element. A control system controls the actuators to release and take up each of the support elements to move the work point with respective to at least two spatial coordinate axes while controlling at least one motion parameter of the work point in a predetermined manner.

25 Claims, 19 Drawing Sheets

FIG. 8

SET INITIAL CONDITIONS

Set Coordinates (feet)

| X: From Left | Y: From Datum |
| --- | --- |
| +xx.xx | +xx.xx |

Dimensional Parameters

| Height (left) | Span | Height (right) |
| --- | --- | --- |
| +xxx.xx | +xxx.xx | +xxx.xx |

Operating Parameters

| Time Increment | Velocity | Distance Increment |
| --- | --- | --- |
| (SECONDS) +xx.xxx | MAX 60 FPM +xx.xx | (FEET) +xx.xx |

Return to Main Panel

| 1 | 2 | 3 |
| --- | --- | --- |
| 4 | 5 | 6 |
| 7 | 8 | 9 |
| . | 0 | - |

| DEL | ENTER |
| --- | --- |

FIG. 10

STRAIGHT LINE

Current Coordinates
(feet)
X        Y
+xx.xx   +xx.xx

Cable Tension
(pounds)
Left     Right
+xxxx    +xxxx

Enter Target Coordinates

| X | Y |
|---|---|
| +xx.xx | +xx.xx |

Total Paint On Time

Minutes   Seconds
+xx       +xx

| Paint Off | Paint On |
|---|---|

| 1 | 2 | 3 |
|---|---|---|
| 4 | 5 | 6 |
| 7 | 8 | 9 |
| . | 0 | - |
| DEL | ENTER | |

| Start Movement | Stop Movement | Return to Main Panel |
|---|---|---|

FIG. 11

RASTER PATTERN

Current Coordinates (feet)
X  Y
+xx.xx  +xx.xx

Cable Tension (pounds)
Left  Right
+xxxx  +xxxx

Enter Raster Parameters

Width | Vertical Index | Number of Rows
(FEET) +xx.xx | (FEET) +xx.xx | INTERGER VALUE +xx Total Paint On Time
Minutes  Seconds
+xx  +xx

| Paint Off | Paint On |

| Start Movement | Stop Movement | Return to Main Panel |

| 1 | 2 | 3 |
| 4 | 5 | 6 |
| 7 | 8 | 9 |
| . | 0 | - |
| DEL | ENTER | |

FIG. 12

WINDOW PATTERN

Current Coordinates (feet)
X  +xx.xx
Y  +xx.xx

Cable Tension (pounds)
Left  +xxxx
Right +xxxx

| Width +xx.xx | Height +xx.xx |

Window Dimensions

| X +xx.xx | Y +xx.xx |

Starting Coordinates (Lower Left Corner)

Minutes  Seconds
+xx       +xx

Total Paint On Time

| Paint Off | Paint On |

| Start Movement | Stop Movement | Return to Main Panel |

| 1 | 2 | 3 |
| 4 | 5 | 6 |
| 7 | 8 | 9 |
| . | 0 | - |
| DEL | ENTER |

SYSTEM AND METHOD FOR POSITIONING A WORK POINT

BACKGROUND OF THE INVENTION

This application is being filed with an appendix of computer program listings.

FIELD OF THE INVENTION

The present invention relates to a system for positioning a work point.

There are many industrial tasks that require the positioning of a human worker or a tool or machine well above or below ground level. For example, in nuclear power plants, radioactive contamination may adhere to the reactor cavity walls during refueling operations. This contamination can become airborne when the reactor cavity walls are left to dry, thus contaminating the entire building. To prevent this, reactor cavity walls must be quickly cleaned before the drying can occur.

The cleaning process can involve abrasive scrubbing, application of superheated pressurized water followed by vacuuming, high pressure blasting or application of a strippable coating which binds the contamination. In any of these decontamination processes, a human worker and/or a tool or working machine must be positioned at a point near the reactor wall to begin the cleaning operation, and must be moved up, down and across the cavity wall so that the entire structure may be cleaned completely. Because the reactor cavity wall is tall, the positioning and movement required to carry out the work is cumbersome, costly and often dangerous.

Typically, the worker or machine is deployed through the use of a crane positioned above a reactor cavity, A cleaning machine may be affixed to the arm of the crane, which then positions the machine at a point in the x-y plane adjacent the wall. Alternatively, a human worker having the necessary cleaning equipment enters a basket at the end of the crane arm, and is moved from place to place along the wall to effect manual cleaning. In either case, the crane is generally deployed from above the reactor cavity. This deployment is undesirable, since the use of these cranes is vital for other tasks, and their unavailability to support reactor cavity decontamination can extend the length of the refueling outage. This is a very costly situation.

Many other industrial applications require a similar positioning of a human worker, tool or machine. Fossil boilers, storage tanks for commodities such as water and conventional fuels, shipyards, dams and bridges, commercial and industrial buildings, skyscrapers, hangars, silos and towers all have a tall vertical surface that may need to be fully traversed to effect cleaning, painting, maintenance, repair or construction operations.

The painting of these structures presents similar problems. As is the case with the nuclear reactor, it is often undesirable or impossible to deploy a crane on the roof or ground abutting the vertical surface. In addition to the need for being able to position the worker, tool or working machine over a wide area, the path over which the work point travels and the velocity and acceleration at which it travels are of critical importance, since all points in the plane must be traversed at a controlled velocity in order to ensure a complete and uniform application of paint. Accordingly, there is a great need for a system that can position a work point while controlling these motion parameters.

SUMMARY OF THE INVENTION

It is therefore an objective of the present invention to provide a system that can effectively position a work point, so that a worker or working machine can perform a given function. It is another object of the present invention to provide a system that can move the work point while controlling one or more of the work point's motion parameters.

These and other objectives of the present invention are achieved by providing a system comprising a plurality of reeving systems and a plurality of adjustable support elements, with each support element connected to the work point and to a corresponding reeving system. The system further comprises actuators for each of the plurality of reeving systems to release and take up the support element connected to it. A control system controls the actuators to selectively accelerate or decelerate the release and take up of the support elements to move the work point from a first position to a second position while controlling at least one motion parameter in a predetermined manner,

BRIEF DESCRIPTION OF THE DRAWINGS

This invention is described in great detail with reference to the following drawings:

FIG. 8 is an illustration of the Set Initial Conditions touchscreen.

FIG. 10 is an illustration of the Straight Line touchscreen.

FIG. 11 illustration of the Raster Pattern touchscreen,

FIG. 12 is an illustration of the Window Pattern touchscreen.

DETAILED DESCRIPTION OF THE PREFERRED EMBODIMENTS

Figure 1:
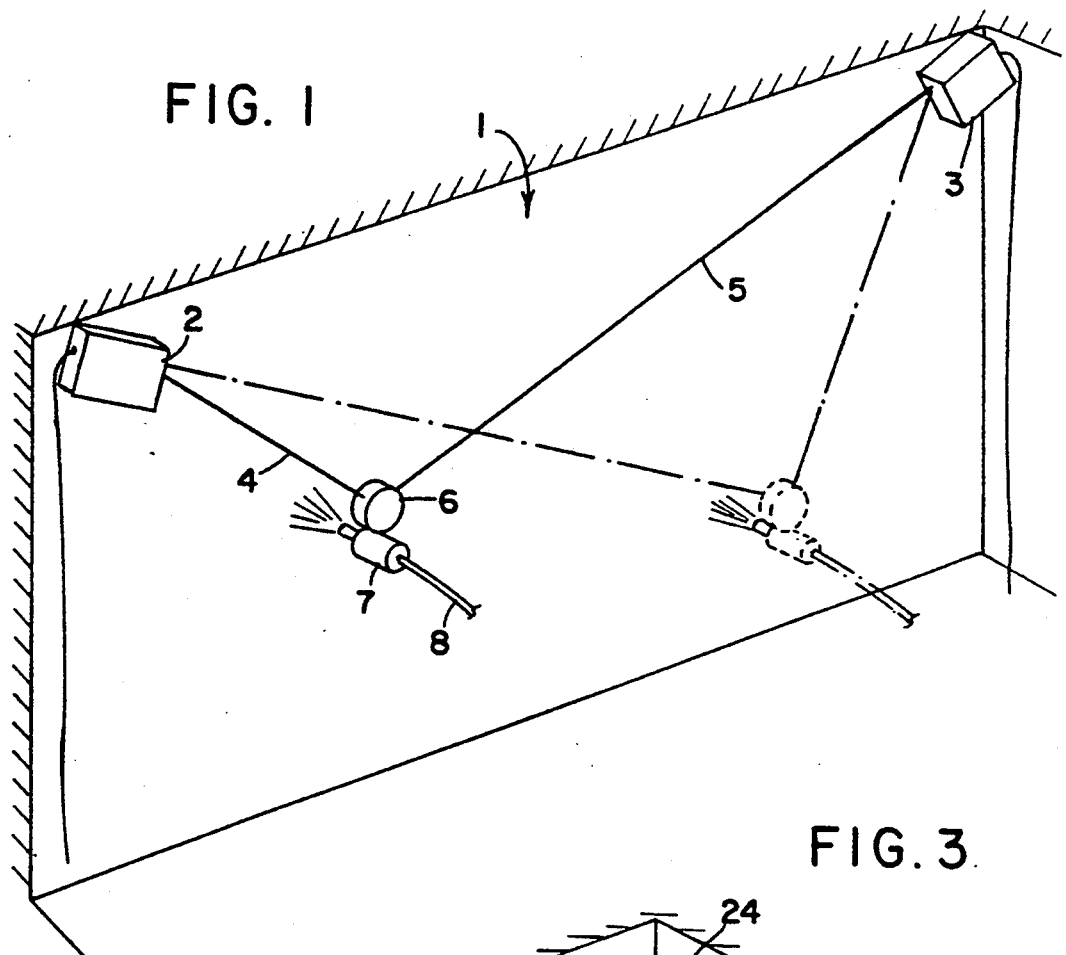
FIG. 1 is an illustration of an embodiment of the present invention positioned with respect to a wall on which work can be performed.

Referring to FIG. 1, two positioning devices 2 and 3 are located at opposite ends of the uppermost portion of vertical wall 1. Two cables 4 and 5 are connected to a load 6, with the free end of each cable being fed through each of the positioning devices respectively. A load or tool, such as paint sprayer 7 and utility tether 8, might also be connected. As is readily apparent from the diagram, the point at which the work point is located and the two points at which the positioning devices are located form a triangle, with the lengths of cable running from each positioning device to the work point constituting two of the triangle's sides.

By arranging the cables in this manner, the position of the work point at any point in time is uniquely defined by the intersection of the two cables. As the length of cable between a positioning device and the work point is varied, the shape of the triangle changes. Because two of the vertices of the triangle are known, the third vertex—the work point—will necessarily move along the wall as the shape of the triangle changes. By controlling the lengths of each of the cables with respect to time, the work point's path, velocity and/or acceleration can be accurately prescribed.

Figure 1B:
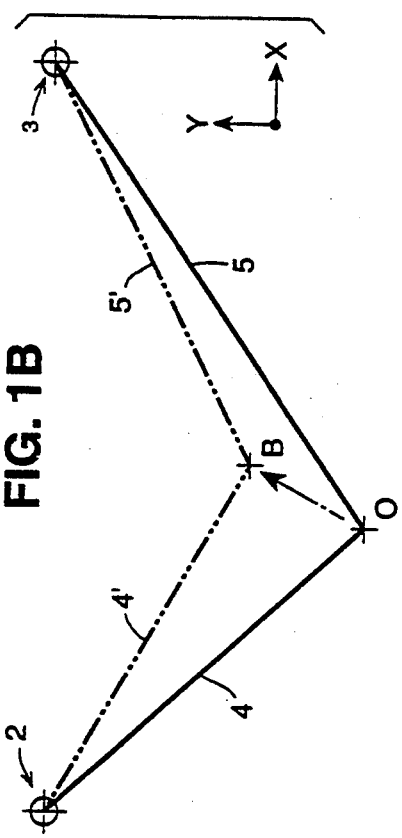
FIG. 1A, 1B and 1C are schematic illustrations of the movement of the work point from a first position to a second position over a path OA OB or OC
Figure 1C:
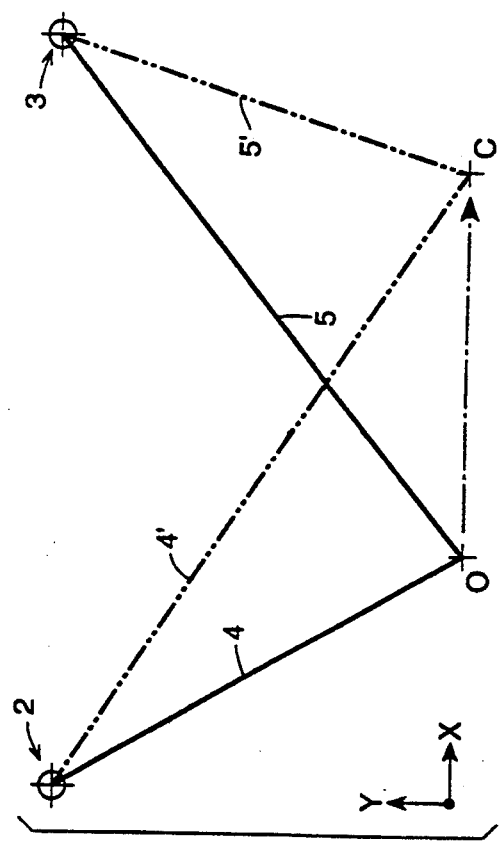
Figure 1A:
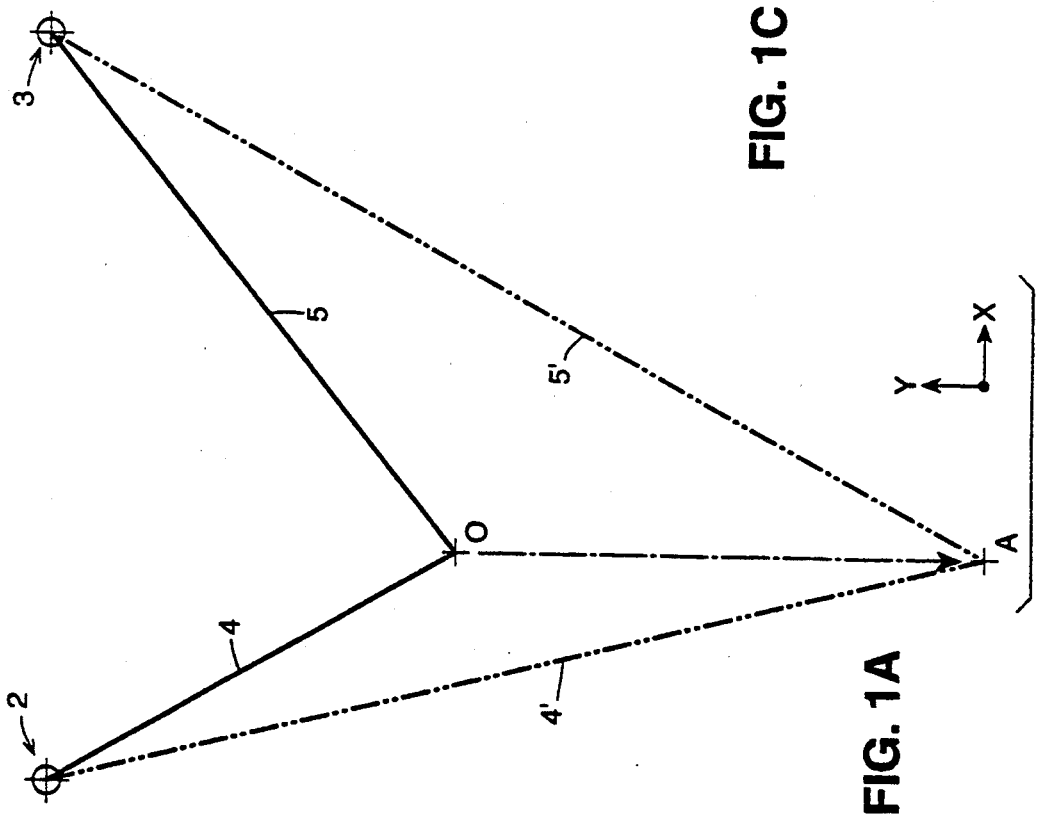

Each of the positioning devices can vary the length of its respective cable by controlling the cable's take-up and release, thereby accurately controlling the position and movement of the work point. FIGS. 1A to 1C schematically illustrate examples of paths that the work point might take. If it is desired to move the work point from point O to point A, each positioning device 2 and 3 would release a portion of its cable. Movement from point O to B, on the other hand, requires that each positioning device take up cable, with positioning device 3 taking up more cable than positioning device 2. A horizontal movement from point O to C requires the release of cable from positioning device 2 and the take up of cable from positioning device 3. As can be readily seen from each of these figures, as the lengths of the cable between each of the positioning devices and the work point changes, the work point, whose position is defined by those lengths, will move accordingly.

In each of these examples, the selective take-up and release of the cables can be used to displace the work point a given distance over any given path in the x-y plane defined by the coordinate axes shown in FIGS. 1A, 1B and 1C. This displacement, along with the first and second derivatives of displacement with respect to time (i.e. velocity and acceleration, respectively), define the motion of the work point. By precisely controlling the cable take-up and release, one or more of these motion parameters can be precisely controlled as the work point is moved in the x-y plane.

In a preferred embodiment of the invention, each positioning device is a power-driven reeving system that can accurately take up and release the desired amounts of cable as required. Each reeving system is a drum/spooling mechanism, and is driven by a power motor to effect take up and release. The unused length of the cable may be wound onto the spooling mechanism as the cable is taken up. For a long cable, the diameter of the spool may change as cable is taken up or released, thereby changing the speed of cable take up and release, even though motor speed is kept constant. To compensate for this effect and maintain a constant take up and release speed, compensating means are provided for adjusting the spool motor speed as the spool diameter changes.

In a preferred embodiment of the inventions a once-through type mechanism is used. With this construction, the end of the cable that is not connected to the work point hangs free after being wound once through the spool. This yields a constant-diameter spool, thereby eliminating the need for the compensating means mentioned. Moreover, because the amount of weight of the drum/spooling mechanisms that must be supported by the reeving systems is reduced, a much longer cable may be used.

Figure 2:
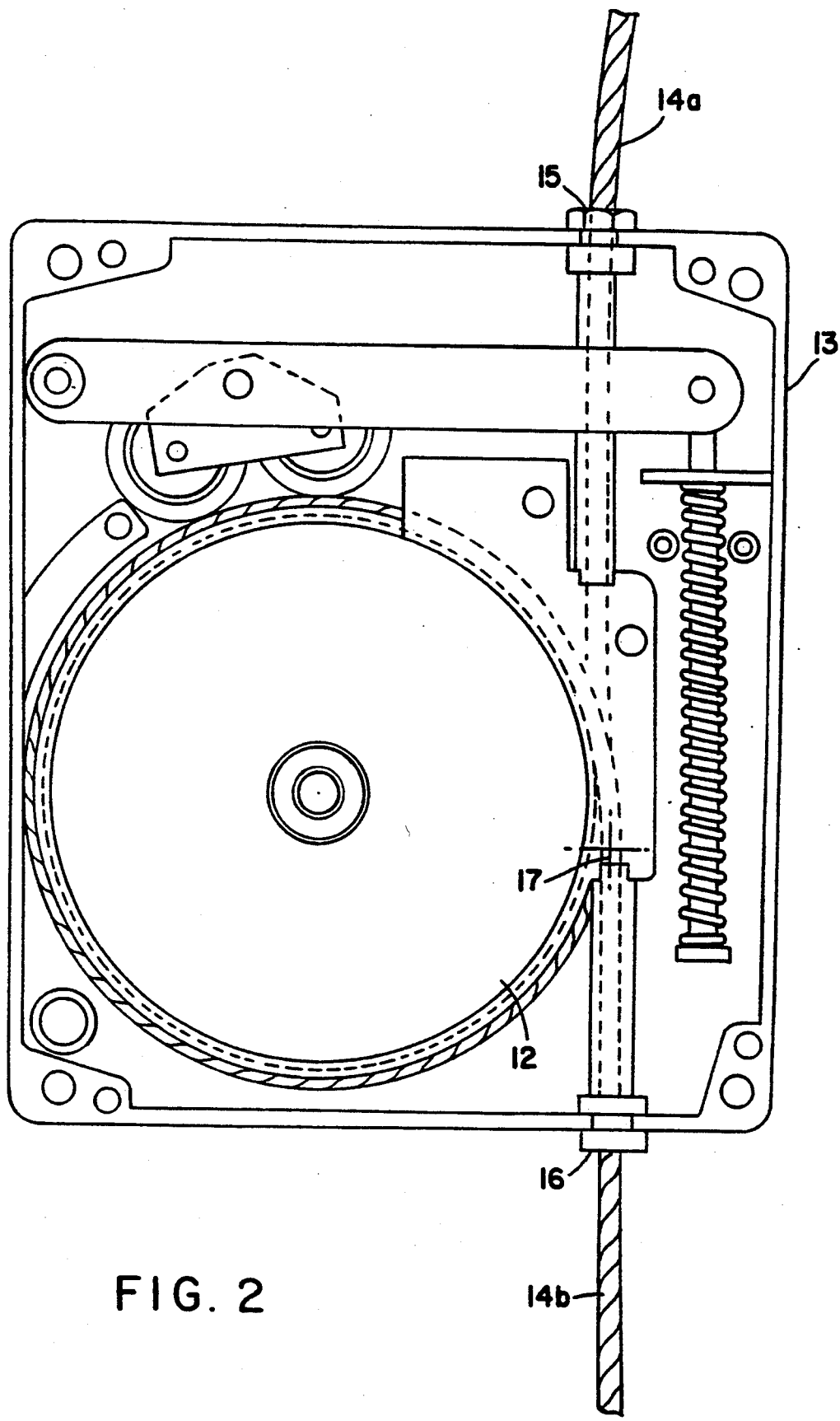
FIG. 2 is an illustration of a reeving system that can be used in the present invention.

An illustration of a preferred reeving system that can be used in the present invention is shown in FIG. 2. As can be seen, spooling mechanism 12 is housed in a casing 13, with cable 14 entering the casing through inlet 16, wrapping once around the spooling mechanism, and exiting the casing through outlet 15. To achieve the maximum accuracy in the movement of the work point, the positioning devices should be arranged on the wall so that they pivot about point 17, which can be any point that passes directly through the centerline of the corresponding cable. For balance, this point would also be ideally located at the center of gravity of the reeving system. By properly selecting the cable and the load, and by limiting the range of motion of the work point, the portion of the cable connected to the work point (i.e. cable portion 14b) will remain taut due to tension, and will be representative of a straight line running between the reeving system pivot point 17 and the point of attachment to the workpoint. The limits of the range of motion are defined by a vertical line drawn through the center of each position device. This allows simple triangulation calculations to be used in controlling work point movement, thereby eliminating the need for complex corrective calculations.

The positioning devices can be either permanently or temporarily attached to the wall, preferably at opposite ends of the wall's uppermost portion. Such attachment may be achieved by mechanical attachments such as bolting, by magnetic force, by adhesives or through the use of properly sized suction cups, such as the 235DP suction cups available from Anver Corporation, 15 Kane Industrial Drive, Hudson, Mass. 01749. Other attachment methods may also be used. If attachment to the wall is undesirable, it is also possible to affix a rigid beam above the wall, and to attach the positioning devices to opposite ends of that beam by any of the above methods. The positioning devices may also be located at the work point itself, with each of the cables fed through the reeving system and connected to known points at the opposite ends of the wall.

Other possibilities for positioning device placement also exist. Two positioning devices may be placed on opposite ends of the floor near the foot of the wall, with a cable run through each positioning device, around a passive pulley wheel attached to the wall above the positioning device, and to the work point.

To maintain tension and minimize load swing, a "Y" configuration is also possible, with a first and second positioning device disposed in each uppermost corner of the wall, and a third positioning device disposed below and between the first two. The third positioning device must itself be able to move horizontally as the work point moves horizontally, so that the section of cable between the work point and the third positioning device remains substantially vertical. An "X" configuration, having a first and second positioning device in each of the top corners of the wall, and a third and fourth positioning device on the floor beneath each of them, will further minimize load swing. In both the "Y" and "X" configurations, a cable is fed through each of the reeving systems, and connected to the work point.

Figure 1D:
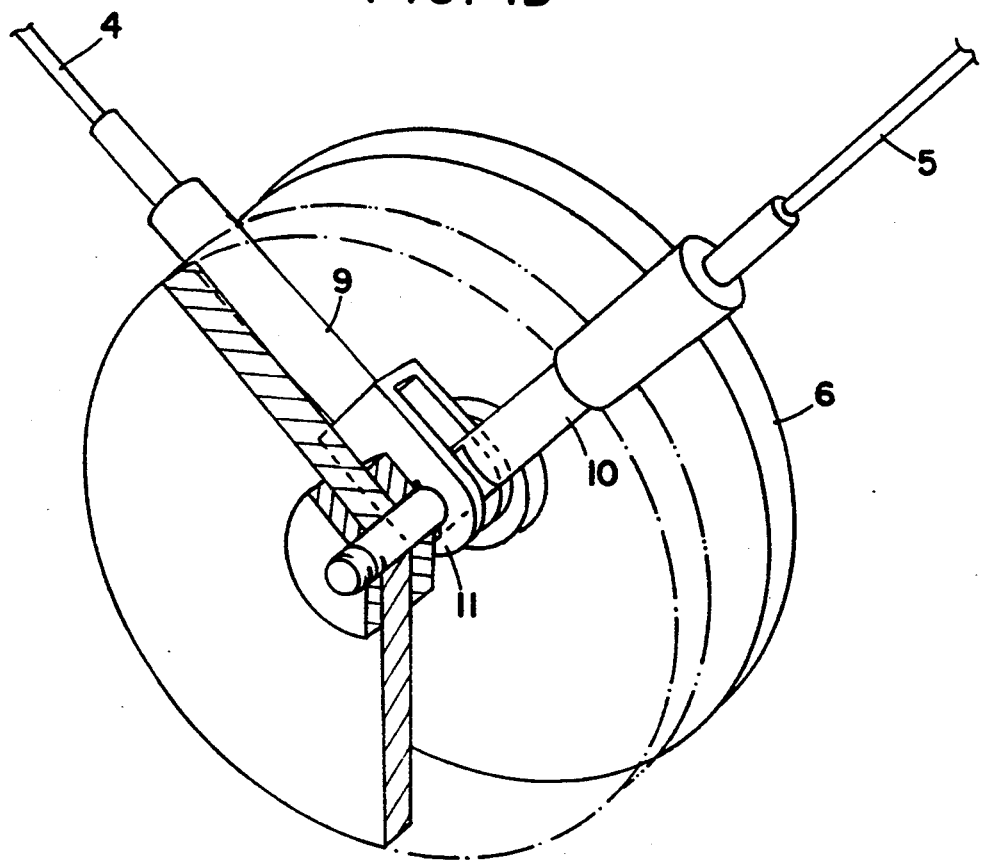
FIG. 1D is an illustration of a yoke and clevis arrangement for attaching the cables to the load.
Figure 1E:
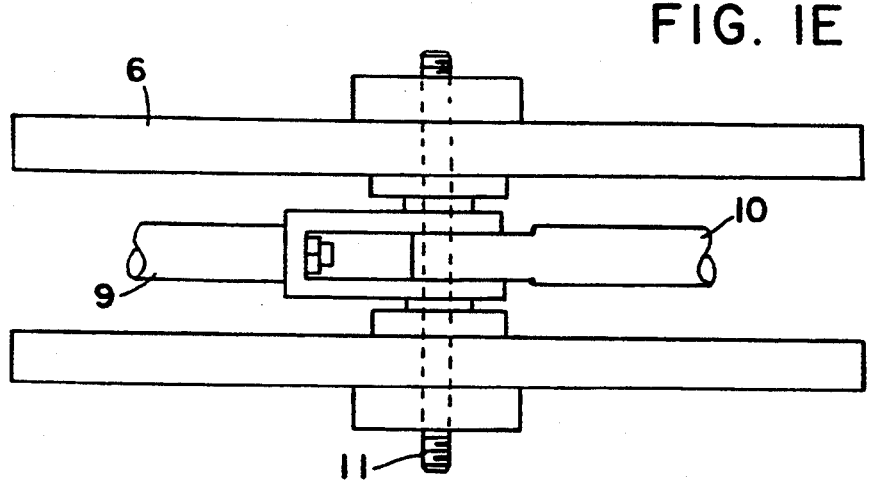
FIG. 1E is a top view of the yoke and clevis arrangement.

The load 6 may be attached to the cables 4 and 5 with the yoke and clevis arrangement shown in FIGS. 1D. As can be seen, yoke 9 has a U-shaped end into which clevis 10 is fitted. The yoke and clevis each have a hole at the portion at which they meet, through which load pin 11 is passed to fasten the two together. FIG. 1E shows a top view of this arrangement, illustrating the position of the load pin. The yoke 9 and clevis 10 will each rotate about the load pin 11 as the work point moves, so that the angle formed by the cables will vary as the work point's position changes. The intersection of the axis of load pin 11 and the centerline of cables 4 and 5 is the work point that is positioned by the system.

Since the load is suspended by cables, the weight of the load will maintain the cables in a taut configuration as long as the weight of the load is substantial relative to the weight and stiffness of the cable. In this connection, when a lighter load is used, extra weight can be added to ensure that the cables remain taut. The load itself is a mass suspended at the point of intersection of the two cables. Although shown as a pair of disks in FIGS. 1D and 1E, the load can be a working machine such a but not limited to, a water sprayer, a paint nozzle, a welding head or a fire hose. Utility tethers may be connected to the load to supply water, vacuum suction, paint, etc. Alternatively, the load itself may carry the supply item so that it is self-contained. The load might also be a platform upon which a human being or working machine can operate, or a human rescue basket. An additional reeving system may also be used as the load, with a working tool suspended from that reeving system with an additional cable, allowing a working tool to be lowered into a narrow hole without interference from the main reeving system cables.

The system may be designed to use a separate cable for each reeving system, or to use a single cable that is fed through each reeving system. If a single cable is used, the work point should be connected to the cable so that the lengths of cable between the work point and each of the reeving systems defines the position of the work point in the same way that the separate cables do. The system must be further constructed so that each of these lengths can be individually taken up or released by its corresponding reeving system. A sufficient amount of cable must be available on each side of the work point, to ensure that the work point is able to traverse the entire region. The dimensions of the wall upon which this system can be used is limited only by the length of cable available. In alternative embodiments of this invention, the cables can be replaced with linear members, such as, but not limited to, telescoping cylinders, rack and pinion drive mechanisms and other mechanical systems.

The positioning devices can also be arranged to allow plane-to-plane movement of the work point so that multi-plane tasks can be performed. For example, each of the positioning devices can be secured to a traveling bridge crane, or to an arm or platform attached to the crane, with the cables fed through the reeving systems to suspend the work point as described above. With this configuration, the arm of the crane or the crane itself could move, thereby moving the work point towards and away from the plane. In a preferred embodiment, the positioning devices are attached to the bridge crane in a manner such that they may each move along the length of the bridge. This movement can be controlled by the same control system that controls the take-up and release of the cables. Such a structure allows the positioning devices themselves to move towards and away from one another, so that navigation of the work point through three dimensional space is facilitated.

Figure 3:
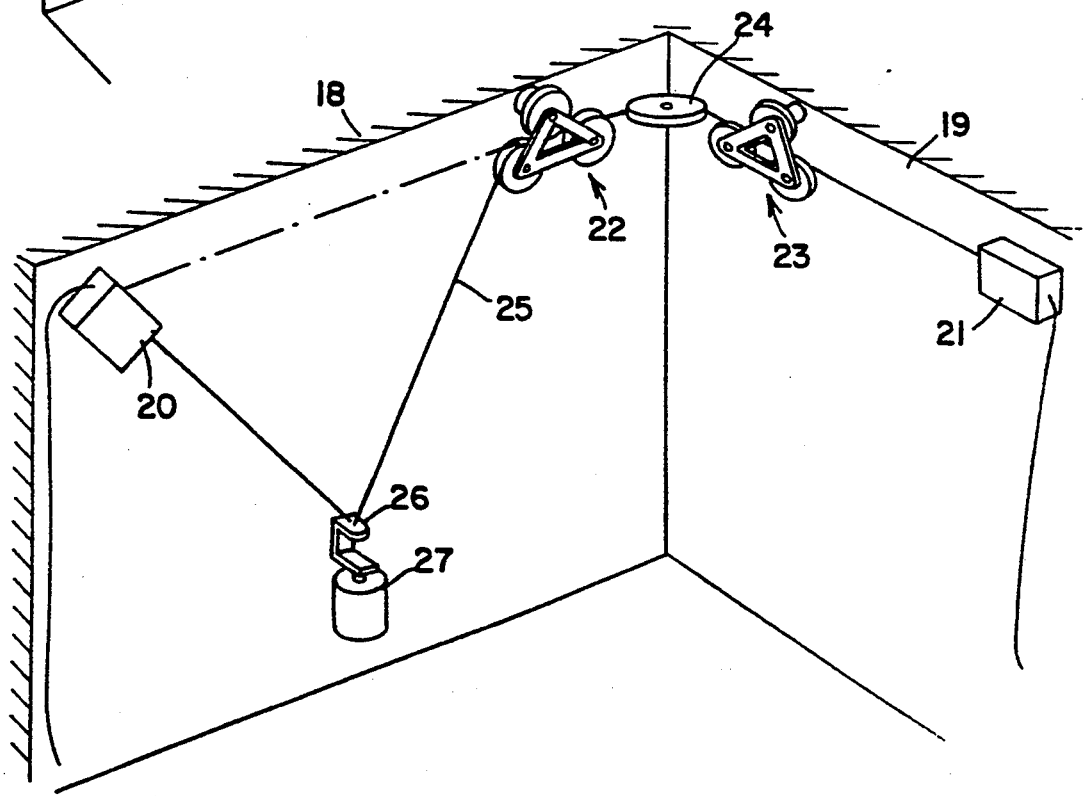
FIG. 3 is an illustration of a second embodiment of the present invention positioned with respect to two adjacent walls.

Another way to accommodate movement from one plane to another is with the arrangement shown in FIG. 3. Walls 18 and 19 are equipped with positioning devices 20 and 21, each comprising a motor and reeving system, in their upper outermost corners. In the top corner where the walls meet, passive pulley wheels 22–24 are disposed. A cable 25 is fed through the reeving system of positioning device 20, pulley wheels 22–24, and the reeving system of positioning device 21. As can be seen from the drawing, pulley wheel 24 is perpendicular to the other pulley wheels, and parallel to the floor, thereby allowing cable 25 to make the corner turn. The load 27 is suspended from the cable by universal joint 26, allowing the cable to pass freely through the pulley wheels at all times. To this end, pulley wheels 22–24 should be positioned a distance from each of walls 18 and 19 sufficient to allow universal joint 26 and load 27 to pass between the pulley wheels and the wall faces.

The work point can be moved along wall 18 by taking up and releasing cable as is done in the single wall case. As the work point moves along paths parallel to wall 18, the portion of the cable between the passive pulley wheels and positioning device 21 will be taut. When the work point is needed on wall 19, each reeving system will rotate in a direction that causes positioning devices 20 and 21 to take up their respective cable, causing the work point to move towards the top of the wall. The entire cable will then become substantially taut. Next, positioning device 20 will release its cable as positioning device 21 takes up its cable, and the work point will travel through the pulleys and to wall 19, which may then be serviced by the work point. The work point can be moved back to wall 18 by reversing this procedure. By deploying additional sets of pulleys in the proper locations, the system can be designed to accommodate three or more walls.

Figure 4:
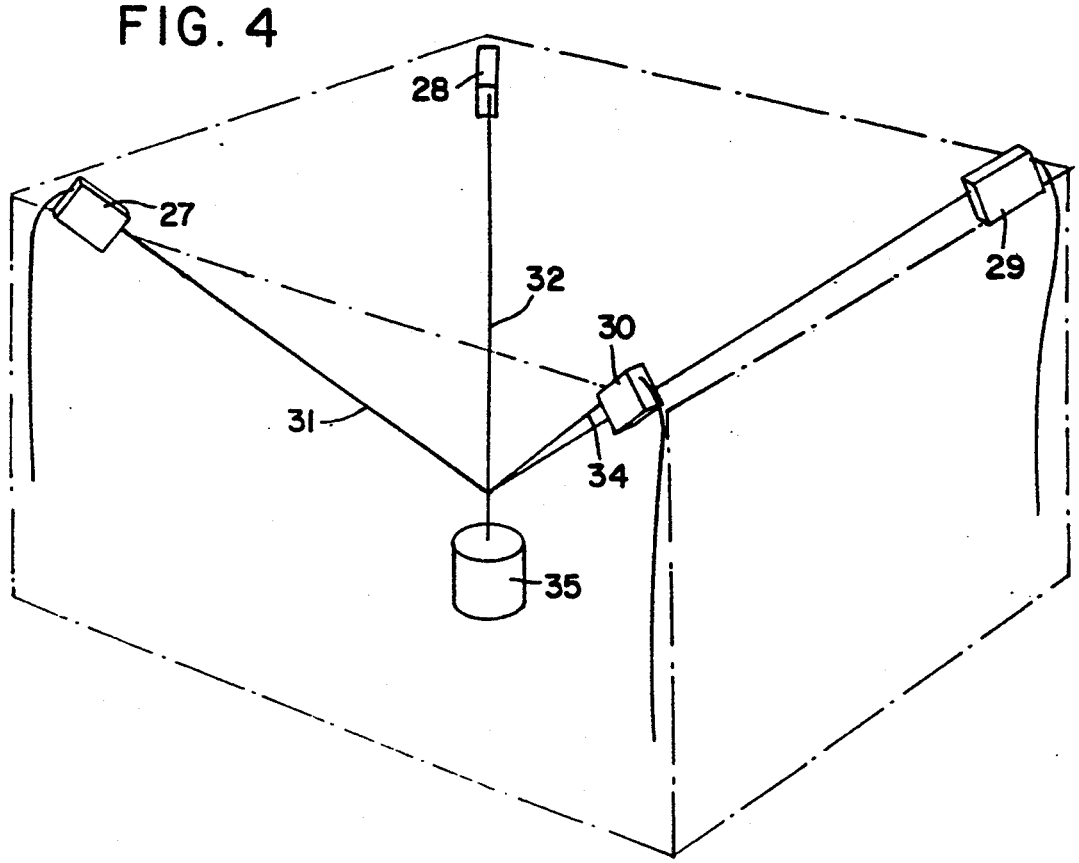
FIG. 4 is an illustration of a third embodiment of the present invention positioned with respect to four adjacent walls.

Multi-plane structures can also be accommodated by deploying three or more positioning devices in select locations. For example, as shown in FIG. 4, four positioning devices 27–30, each comprising a motor and reeving system, may be deployed in the top four corners of a room having four walls. One of cables 31–34 are fed through the reeving system of each positioning device, with each cable supporting load 35. With this configuration, controlled take-up and release of the cables will move the work point through the three-dimensional space defined by the walls, allowing for the positioning of the work point within that space.

Figure 4A:
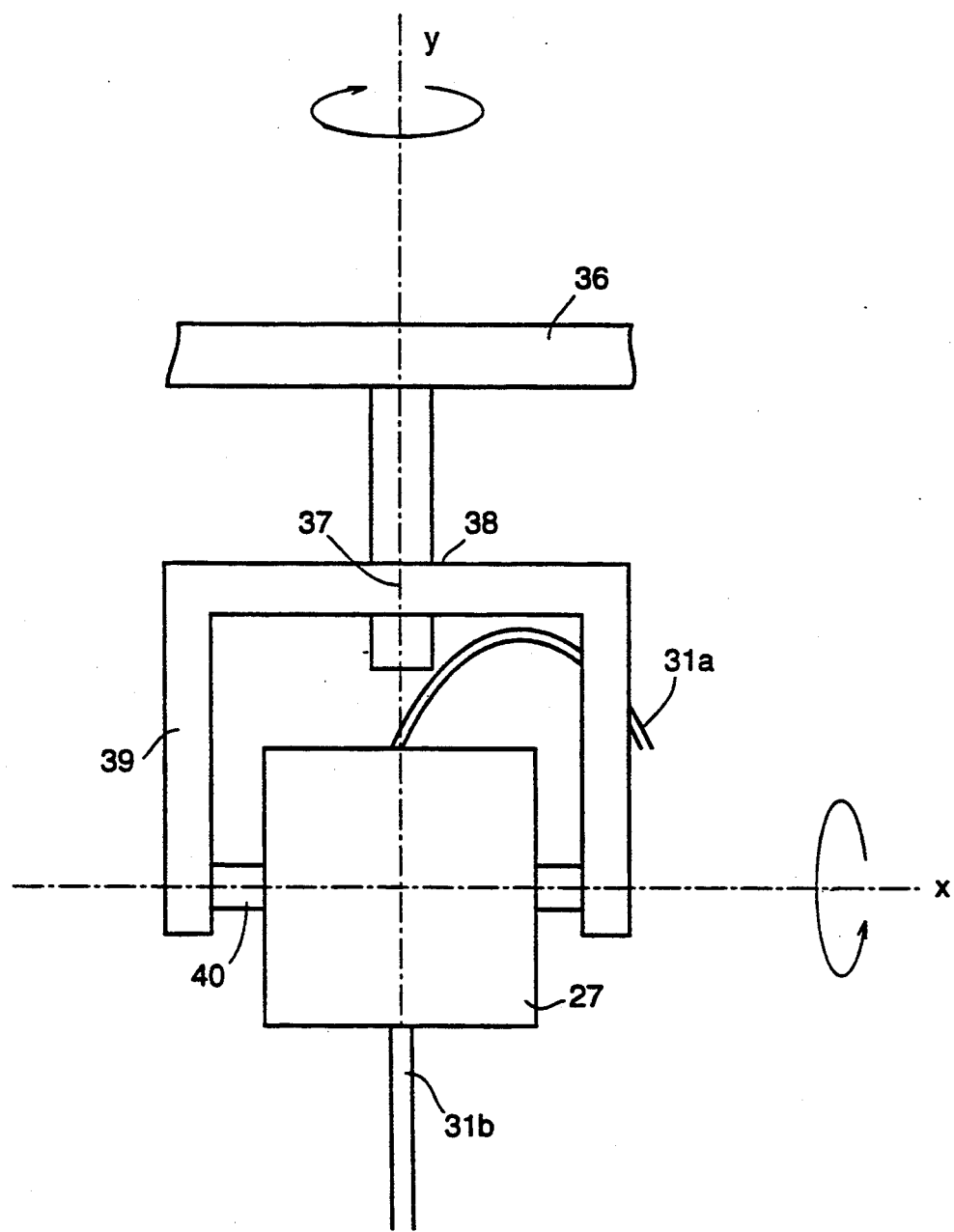
FIG. 4A is an illustration of the positioning device attached to a corner of the wall in the third embodiment of the present invention.

In the three-dimensional case shown in FIG. 4, the positioning devices can be arranged in the corners so that they pivot horizontally and vertically about a point that passes through the centerline of its corresponding cable. This arrangement is illustrated in FIG. 4A. A yoke 39 is connected to a support member 36, which can be disposed in a corner of the room, or in any other known location. Radial bearings 37 and thrust bearings 38 are provided where the support member 36 and yoke 39 connect, to support the yoke and allow it to pivot about the axis labeled y. This axis corresponds to the centerline of cable section 31b of cable 31, which is the portion of the cable that actually supports the load. The other portion of the cable, cable section 31a, hangs free. The positioning device 27 is fitted between the forks of yoke 39, with radial bearings 40a and 40b provided on each side to allow the reeving system to pivot about the axis labeled x. This axis can be any line that passes through the reeving system and is orthogonal to axis y. By supporting each of the positioning devices 27–30 in this manner, each positioning device 27–30 may pivot horizontally and vertically about a point that passes directly through the centerline of its corresponding cable. As in the two-dimensional case, this structure allows simple triangulation calculations to be used in describing the movement of the workpoint, eliminating the need for corrective calculations.

In many tasks, it is critical that path over which the work point travels and the velocity and acceleration at which the work point moves be accurately controlled. For example, in the case where the painting of a wall will be performed with the present invention, the operator desires that a uniform coat of paint be applied everywhere on the surface of the wall. To achieve this, it is preferred to move the spray nozzle along a path that allows it to apply its paint to all points once. For example, if a spray nozzle moving horizontally across the wall applies a band of paint having a bandwidth of four inches, a possible path of movement is a raster pattern in which the spray nozzle moves from left to right, drops down four inches, moves from left to right, and continues the pattern for the height of the wall. To ensure that the paint is evenly applied, the velocity of the spray nozzle as it moves along its path should remain constant. To provide this type of motion, the system should include a computerized control system that controls the reeving systems and the take up and release of the cables so that velocity of the work point can be kept constant as it is displaced in any direction, and more generally, so that the motion parameters of displacement, velocity and acceleration can be precisely controlled.

Figure 5:
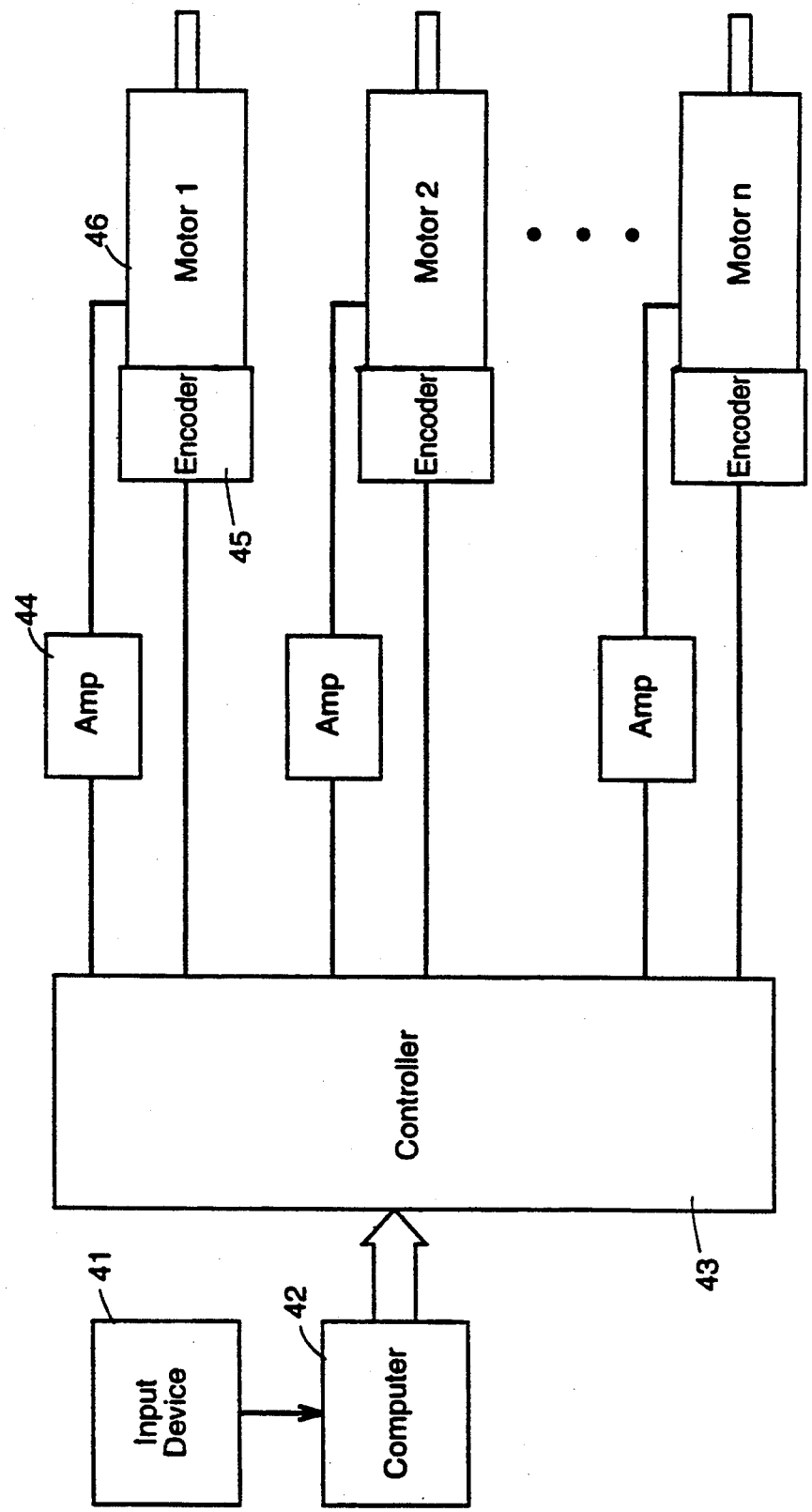
FIG. 5 is a block diagram of a control system that can be used to control the movement of the work point in the present invention.

Such automated control of the positioning devices is accomplished through the use of commercially available motion control systems. A commercially available servo and machine controller, such as the Compumotor ® 4400 manufactured by Parker Hannifin Corporation, located at 5550 Business Park Drive in Rohnert Park, Calif., 94928, may be used in conjunction with such computer compatible motors. As shown in FIG. 5, an input device 41 is connected to a computer 42, such as a personal computer or the like, which is in turn connected to a servo and machine controller, or more simply controller 43. For each reeving system, the servo controller 43 is connected to a torque amplifier 44 and an encoder 45, each of which is connected to a motor 46. With this arrangement, the servo controller 43 controls the direction and speed of rotation of each of the reeving devices, thereby controlling the take up and release of the cables and the motion of the work point.

The servo controller 43 contains a RAM and a non-volatile memory which can store computer programs for generating command data. Computer programs that generate command data can be written on the computer, in a programming language such as Parasol ® II, available from Parker and specially designed for motion control applications and for generating such command data. The computer programs are then downloaded to the Compumotor ® memory via a serial port. The program will accept user input indicating the paths and velocity of the work point, and use this input to generate the command data.

To aid the user in inputting the motion parameters, an application program such as Panelmaker ®, available from Parker, may be used to create a series of interactive touchscreen panels. These panels allow the user to easily set the initial conditions of the system, and to easily select the desired movement of the work point. In addition, they allow the user to control the work performed by the load, such as painting or cleaning. Examples of suitable touchscreen panels that can be created with Panelmaker ® software are shown in FIGS. 6 through 10.

Figure 6:
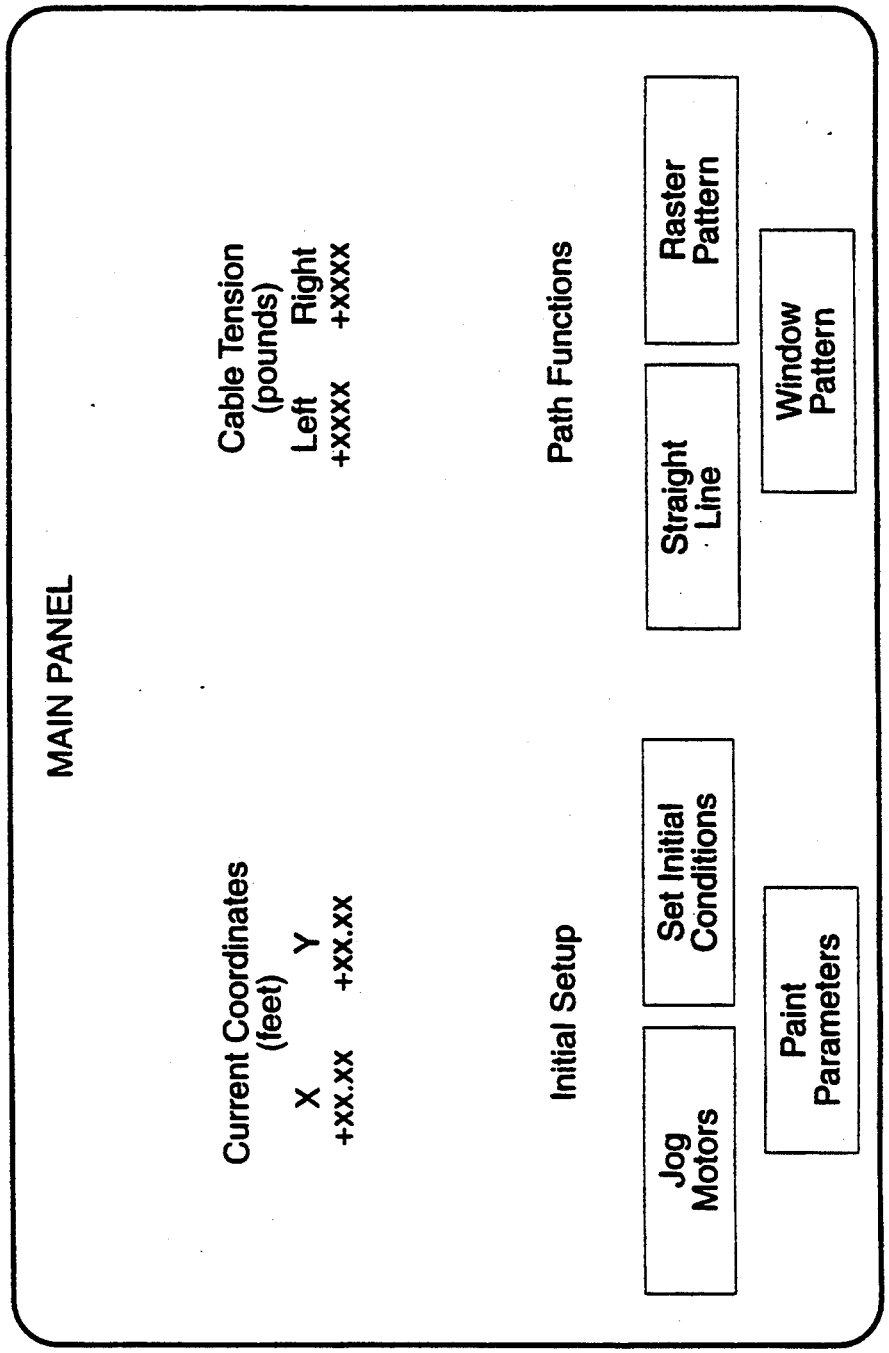
FIG. 6 is an illustration of the Main Control Panel touchscreen.
Figure 7:
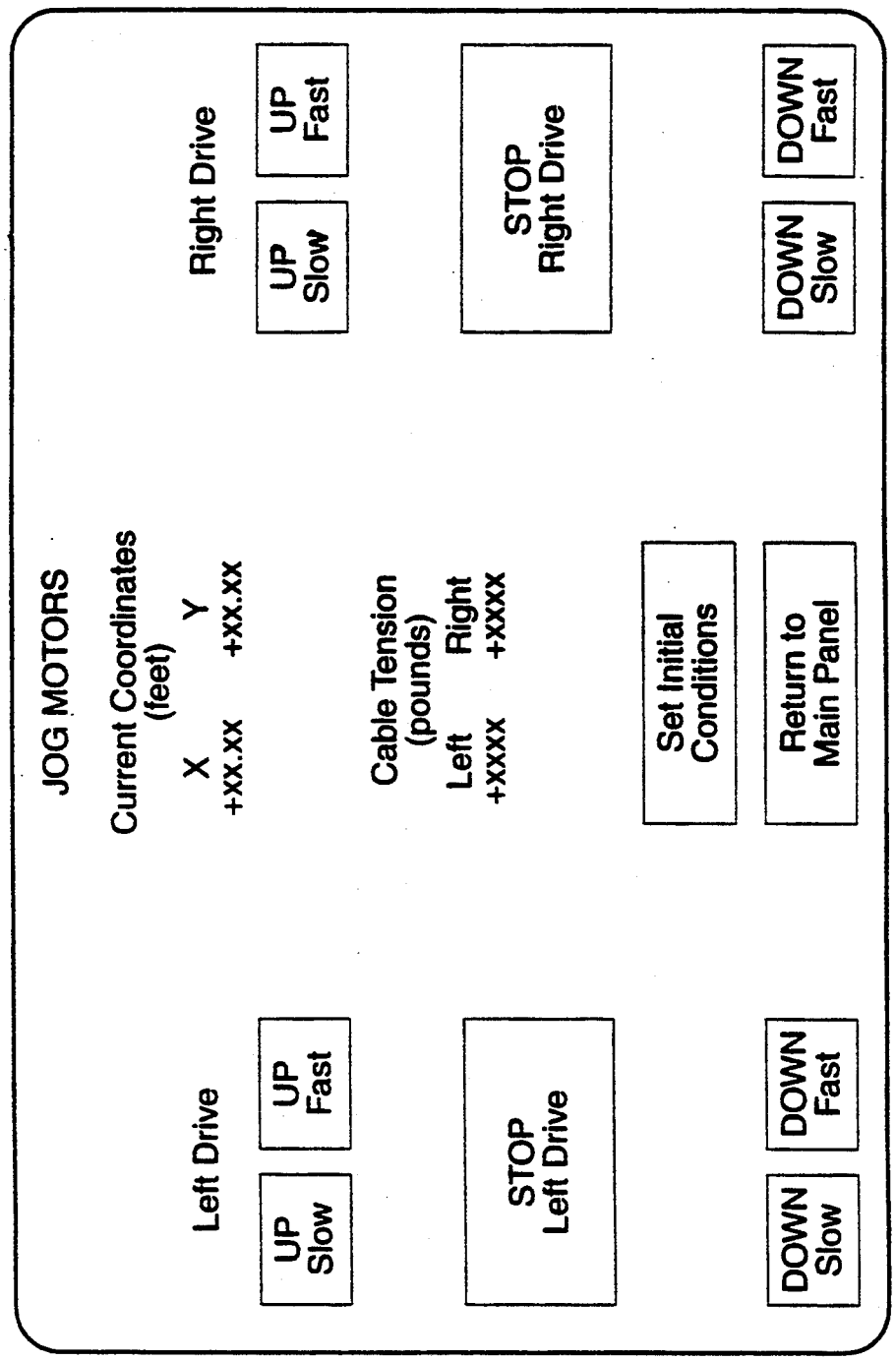
FIG. 7 is an illustration of the Jog Motor touchscreen.

An example of exemplary touchscreens that allow the user to program the movement of the work point for a painting application will now be described with reference to these drawings. FIG. 6 depicts the Main Control Panel screen, which is one in a series of touchscreens provided to allow the user to program the movement of the work point. The screen displays the current x-y coordinates of the work point and the tension of each of the cables, and allows the user to select screens for defining the Initial Setup of the system, as well as screens for defining the movement of the work point.

For safety, the tension on each of the cables is measured with a load cell provided with each of the reeving systems. Each load cell produces a voltage proportional to the tension on its corresponding cable, which is converted to a digital number by an analog-to-digital converter. This value is then converted to pounds by the software using a calibration curve previously determined experimentally by placing known weights on the load cell.

The user must use the Initial Setup screens to initialize the system. The user begins by accessing the Jog Motors screen, shown in FIG. 7, which provides a display that allows the user to move the work point through the plane on a real-time basis. The screen provides controls for speeding up and slowing down the rotation of each of the drives in either direction, and for stopping the rotation of each of the drives completely. The user manipulates the controls for each of the drives on a real time basis to move the work point to a position in the plane whose coordinates are known.

Once the work point is in a known position, the user switches to the Set Initial Conditions screen by pressing the appropriate location on the Jog Motors touchscreen. This screen, shown in FIG. 8, allows the user to enter the x-y coordinates of the work point, measuring x and y from predetermined datums. The height of each of the two reeving systems on the wall (measured from the datum level to the center line of each reeving system) is also entered, along with the span between the reeving systems. Finally, the user enters the desired velocity of the work point, and the increment (in time or in distance) between consecutive intermediate calculations.

Figure 9:
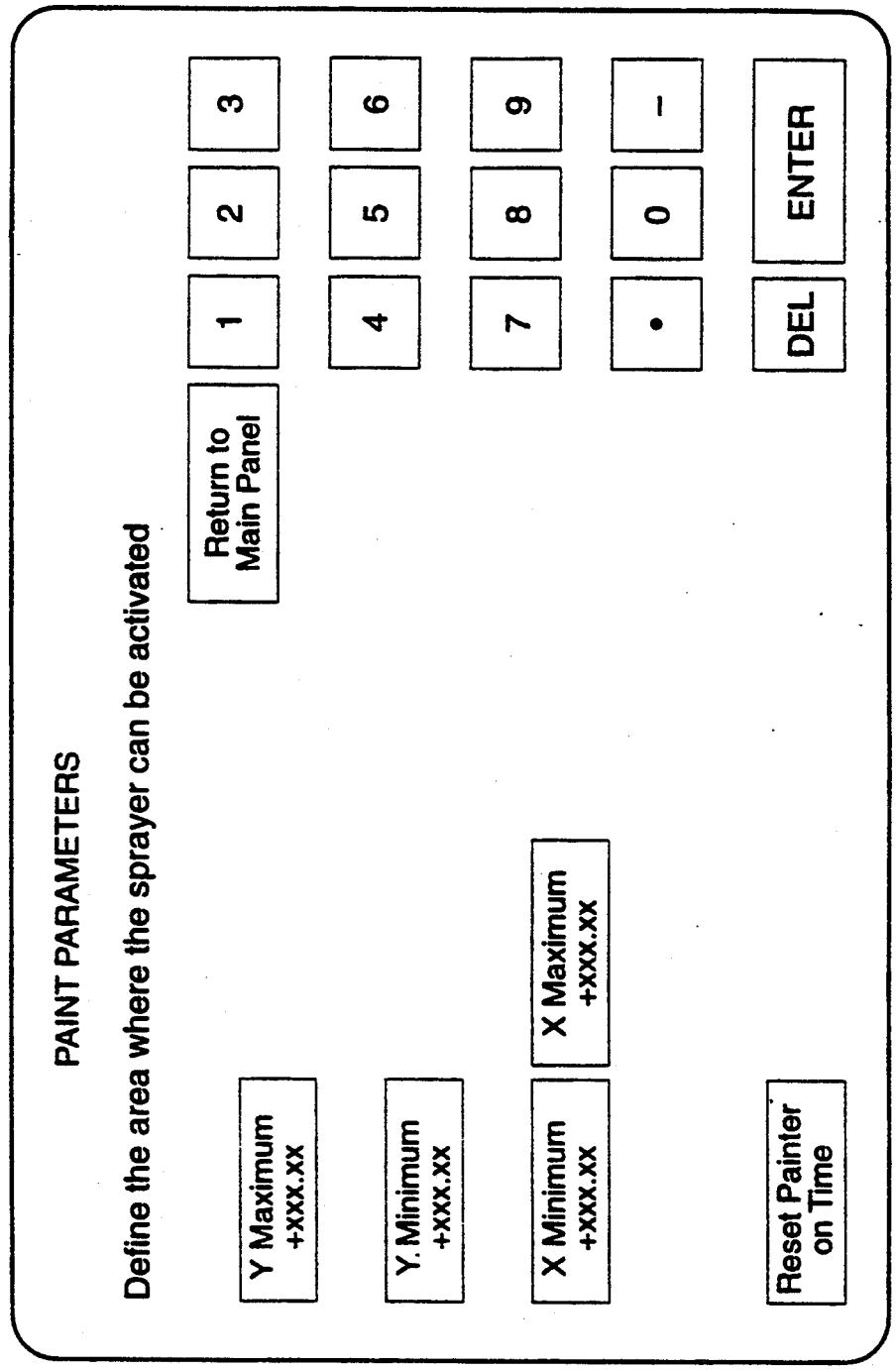
FIG. 9 is an illustration of the Paint Parameters touchscreen.

Once the initial conditions are input, the user returns to the Main Control Panel, and from there changes to the Paint Parameters screen depicted in FIG. 9. This screen allows the user to define an area in the plane where the working machine connected to the work point, in this case a paint sprayer, can be activated. The area is defined in terms of a maximum and minimum horizontal value and a maximum and minimum vertical value. Unless the work point is within these boundaries, the paint sprayer cannot be activated. The Paint Parameter screen also allows the user to reset the Painter On Time Counter, which is a running clock that monitors the total time that the sprayer is active in order to monitor paint consumption.

Next, the user again returns to the Main Panel, and then selects an option for defining the path over which the work point will travel. If the Straight Line option is chosen, the screen of FIG. 10 will appear. The user simply enters the target coordinates—the coordinates of the point to which he wants to move the work point—and depresses the appropriate area of the touchscreen to initiate movement. The work point will then move in a straight line to the target point at the previously specified velocity. The painter can be turned on or off at any time during the work point's movement (provided it is within the area in which it may be activated), and the movement can be stopped at any point.

Figure 11A:
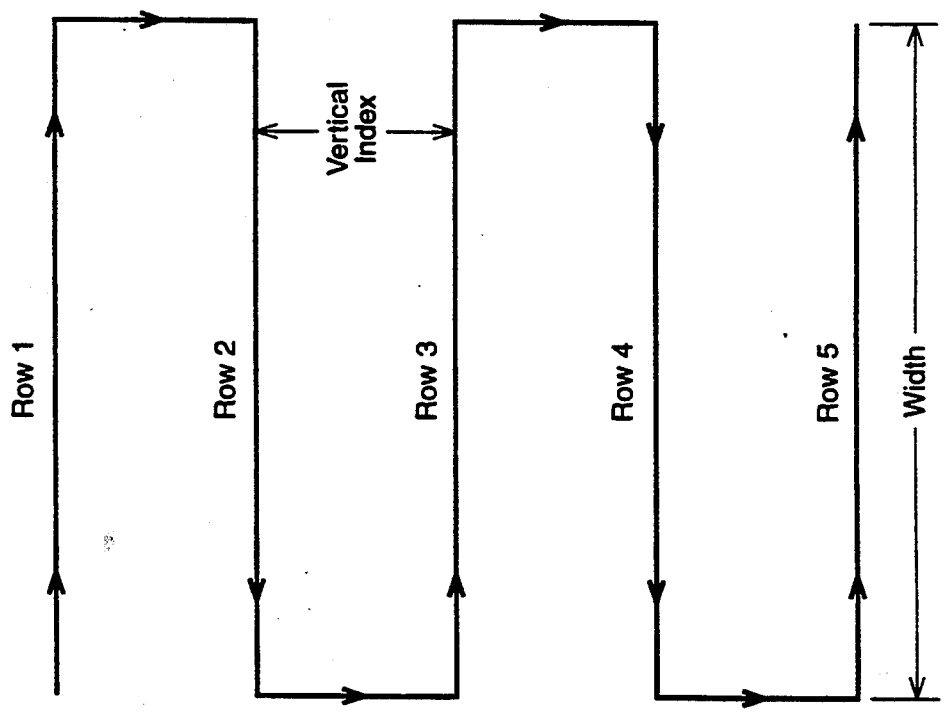
FIG. 11A is an illustration of Raster Pattern movement.

If the user selects the Raster Pattern option from the Main Control Panel, the screen shown in FIG. 11 will appear. To program this type of movement, the user inputs a width, a vertical index and a number of rows. As illustrated in FIG. 11A, when movement is initiated, the work point will travel horizontally at the prescribed velocity for a distance equal to the entered width. The work point will then drop vertically by an incremental distance specified by the vertical index, and will move from right to left over the same width. This pattern will continue a number of times equal to the number of rows input by the user. As in the case of straight line movement, the painter can be turned on and off and the motion can be stopped at any time.

Figure 12A:
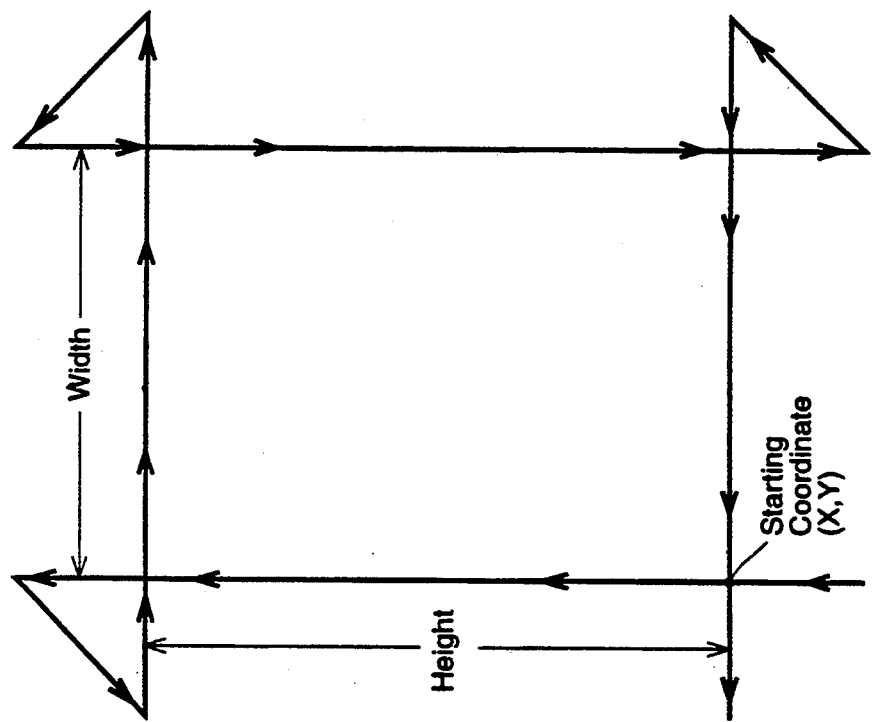
FIG. 12A is an illustration of Window Pattern movement.

The Main Panel also provides the Window Pattern option. This screen, shown in FIG. 12, allows the user to program the system so that the work point will trace a rectangular window pattern. The user simply inputs the height and width of the desired window, along with the coordinates of the window's lower left corner. Upon initiation, the work point will travel at the prescribed velocity from its start point to the lower left corner of this window, and will then follow the perimeter of the window in a clockwise direction. As shown in FIG. 12A, it is necessary in this movement pattern to overshoot at each of the corners, in order to ensure complete paint coverage, and to prevent "runs" and "sags" that can occur when the unit stops. Once again, the painter can be enabled or disabled and the movement can be stopped at any time.

The calculations used by the Parasol II ® computer program to control the motion of the workpoint will now be explained in greater detail. To move the work point along any path from a start position to an end position, including along a straight line, the location of points along that path must be calculated. Generally speaking, the smaller the distance between consecutive points used to define the path, the closer the actual movement of the work point will resemble the desired path. Accordingly, when a greater resolution is desired, more points must be used.

In the current embodiment, any arbitrary path can be approximated by a number of straight line path segments. For each segment, the program calculates the length between the start and end positions, or path length, and then calculates the number of intermediate points by dividing the path length by the distance increment, which the user can input. Alternatively; if a time increment was input by the user, the distance increment is calculated by multiplying the time increment by the specified velocity input by the user.

To move the work point an incremental distance along the path, for each positioning device, the length of its corresponding cable at the beginning and end of that distance increment is calculated according to the following formula:

$$L = \sqrt{(x^2 + y^2)}$$

where L represents the cable length, and x and y represent the horizontal and vertical distances of the work point from the cable's corresponding reeving system. The program then calculates the difference in the length of each cable at the beginning and end of the distance increment. These differences are converted by the computer program into encoder counts, which are sent to the controller to command the rotation of the motors.

To calculate the number of encoder counts to take up or release a unit cable lengths two constants must be known—the number of motor revolutions needed to take up or release a unit length of cables and the number of encoder counts per revolution. The revolution to cable length conversion factor is determined by counting the number of motor input revolutions to the single reduction worm gear to complete one turn on the friction wheel. The number of encoder counts per revolution is determined from the encoder specifications. With this data, the program calculates a number of encoder counts for each time increment needed to effect the proper amount of cable take up or release.

Figure 13:
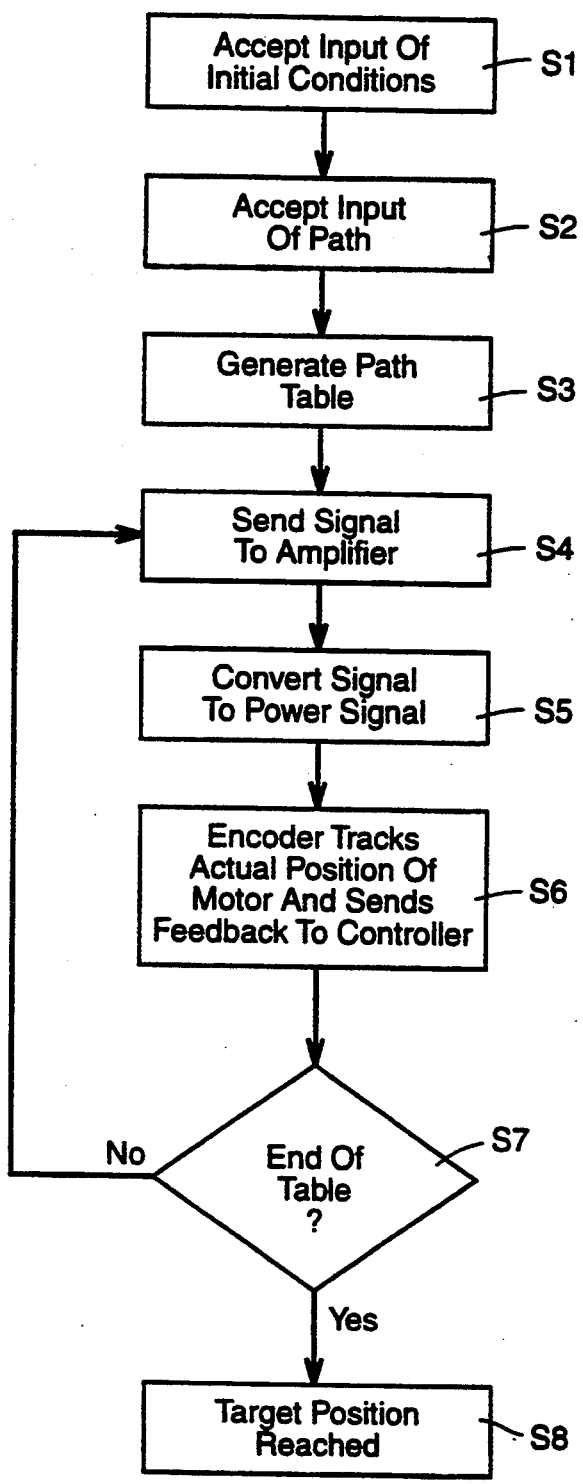
FIG. 13 is a flowchart describing the programing of the control system that controls the work point's motion, FIG. 14 illustration of a work point move from a start position to an end position along a predetermined path.

A flowchart describing the control of work point motion is shown in FIG. 13. The program begins in step S1 by accepting initial conditions input, which includes the start position of the work point, the desired velocity, and the incremental time or distance between consecutive intermediate points. In step 2, the program then accepts input indicating the desired path of the work point.

In step S3, the program generates a specific path table for each reeving system, each path table being a two column matrix. In one column, time increments are specified. If the user has input a time increment, then the program simply uses the specified time increment. On the other hand, if the user inputs a distance increment, then the program divides the distance increment by the velocity input by the user. For each entry in the time increment column, the program derives a corresponding encoder count in the second column, as described above.

As can be readily seen, by appropriately specifying the number of encoder counts for each time interval specified in the path table, the computer program can control the velocity of the work point along the path length or the acceleration of the work point along the path length. For many tasks, a constant velocity work point is desirable.

As stated above, the command data in the path table is sent to the controller to command motor rotation to move the work point over the desired path at the desired velocity or acceleration. The actual velocity and acceleration of the motors will be a function of the motor controller, which has built in gain parameters to ensure that the motor, and hence the work point, moves smoothly in accordance with the commands.

Having generated the path table, the controller in step S4 will send a control signal to the amplifier of each motor for each time increment. The control signal is a function not only of the number of encoder counts in the corresponding location of the path table, but also of the gain parameters of the controller and, optionally, externally supplied parameters relating to items such as safety criteria (i.e. unsafe cable overtension and collision avoidance) or process conditions at the work point.

In step S5, the amplifier converts the signal generated in step S4 to produce a power signal capable of effecting motor rotation in accordance with the number of encoder counts received as part of the control signal. The encoder then feeds back the actual motor position to the controller in step S6, which can compensate for nonlinearity of motion using its built in gain parameters. In step S7, the program will then return to step S4 for the next time increment in the path table, if the end of the path table has not been reached.

Two examples of how the left cable velocity is calculated in a two positioning device system will now be described. In each of these examples, the origin of the coordinate system is set at the location of the left reeving system, with movement in the positive x direction being towards the right, and movement in the positive y direction being downward. Right cable velocity can be calculated in a similar way. For the purpose of clarity, the diagrams corresponding to these examples show only the left positioning device and the left cable.

EXAMPLE 1

Figure 14A:
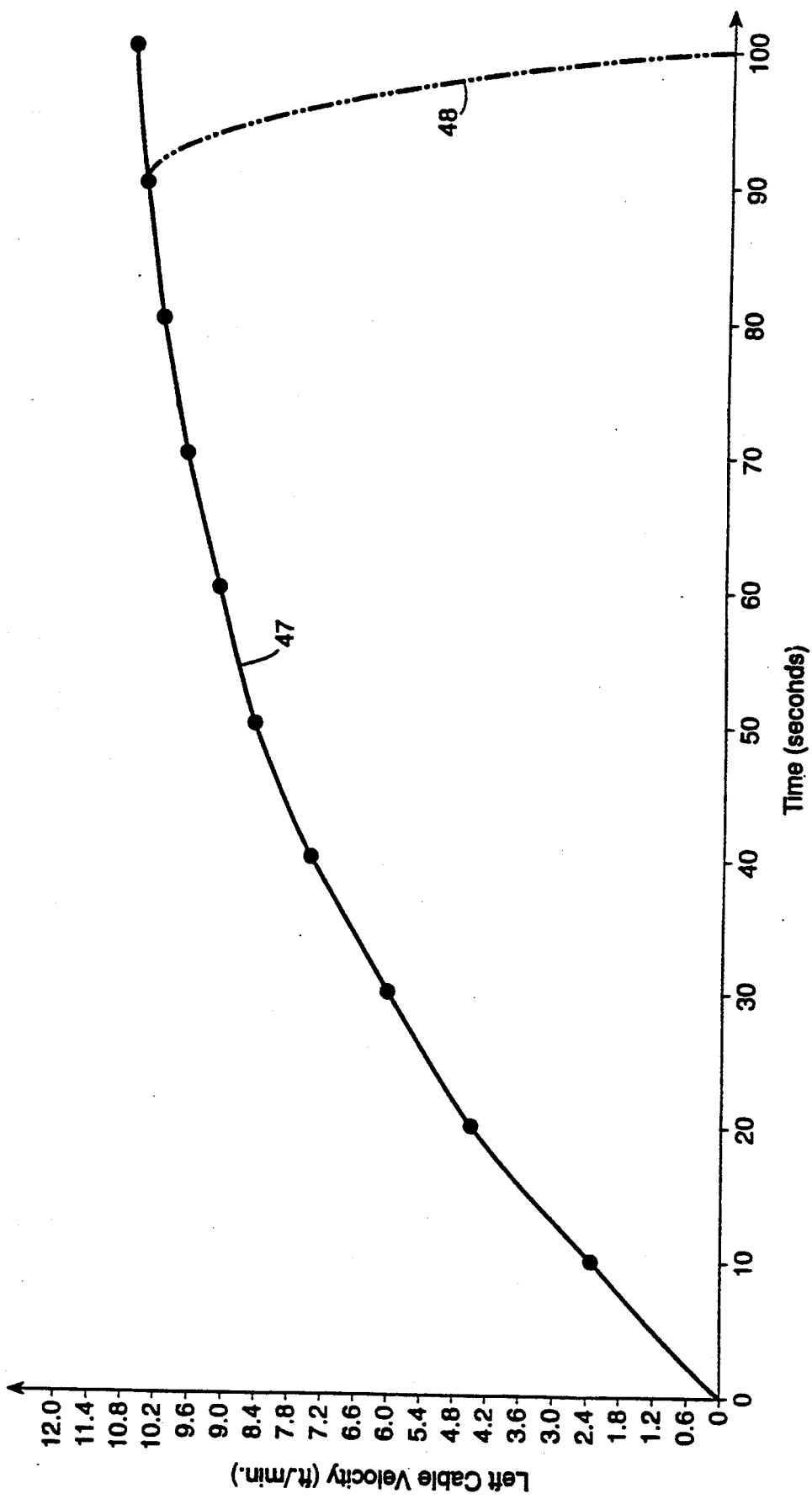
FIG. 14A is a graph showing the relationship between time and left cable velocity for the move shown in FIG. 14.
Figure 14:
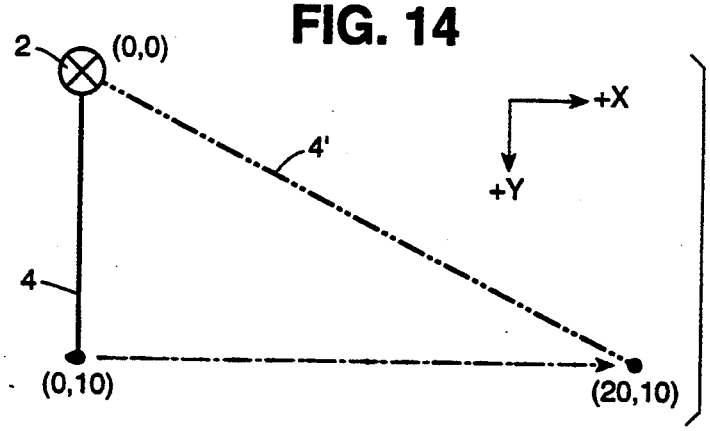

FIG. 14 shows a move of the work point from a first position (0, 10) to a second position (20, 10) along the horizontal path indicated by the dotted line. The displacement of the work point has an x component of 20 feet and a y component of 0, with the total distance traveled by the work point being 20 feet. As can be seen from the figure, the left reeving system 2 will release the left cable 4 for the duration of the move.

A curve 47 was plotted to illustrate the relationship between left cable velocity and time for a constant work point velocity of 12 ft/min, and is shown in FIG. 14A. At this velocity, the total time of the move is 100 seconds, with the velocity of the work point being 12 ft/min in the x direction ($dx/dt = 12$) and 0 ft/min in the y direction ($dy/dt = 0$). As can be seen by curve 47, the velocity of the cable release begins at 0, and increases monotonically as the work point moves along its path.

EXAMPLE 2

Figure 15:
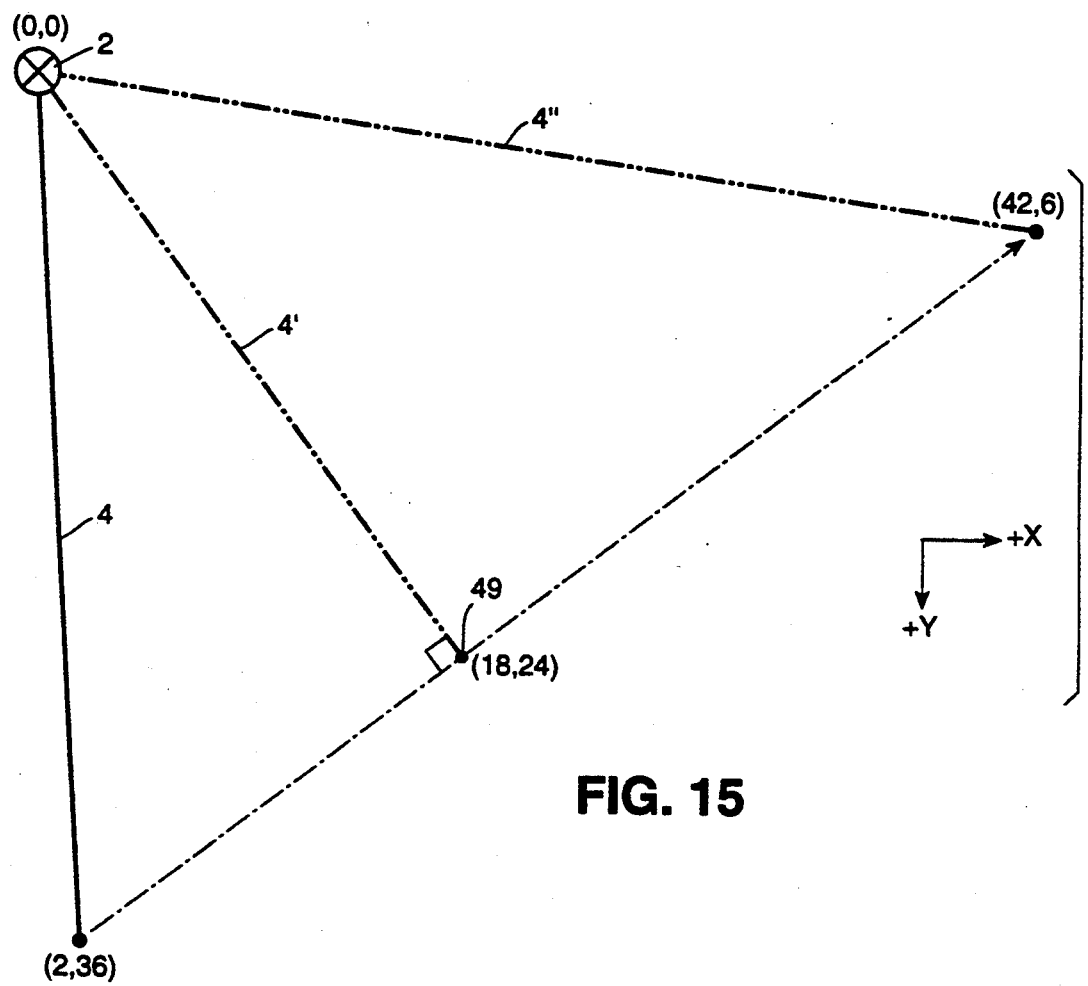
FIG. 15 is an illustration of a another work point move from a start position to an end position along a predetermined path.

FIG. 15 shows a work point move from a first position (2, 36) to a second position (42, 6) over the indicated path. Because this move involves both horizontal and vertical displacement, the relationship between cable velocity and time for this move is slightly more complex. The displacement of the work point has an x component of 40 feet and a y component of negative 30 feet, with the total distance traveled by the work point being 50 feet. As can be seen from FIG. 15, reeving system 2 will take-up cable during the first portion of the move, until the work point reaches the position 49, at which the cable and the work point are orthogonal to each other. When the work point is in this position, the cable length is at its shortest. Once this position is reached, the reeving system will reverse its rotation, and will release cable for the remainder of the move.

Figure 15A:
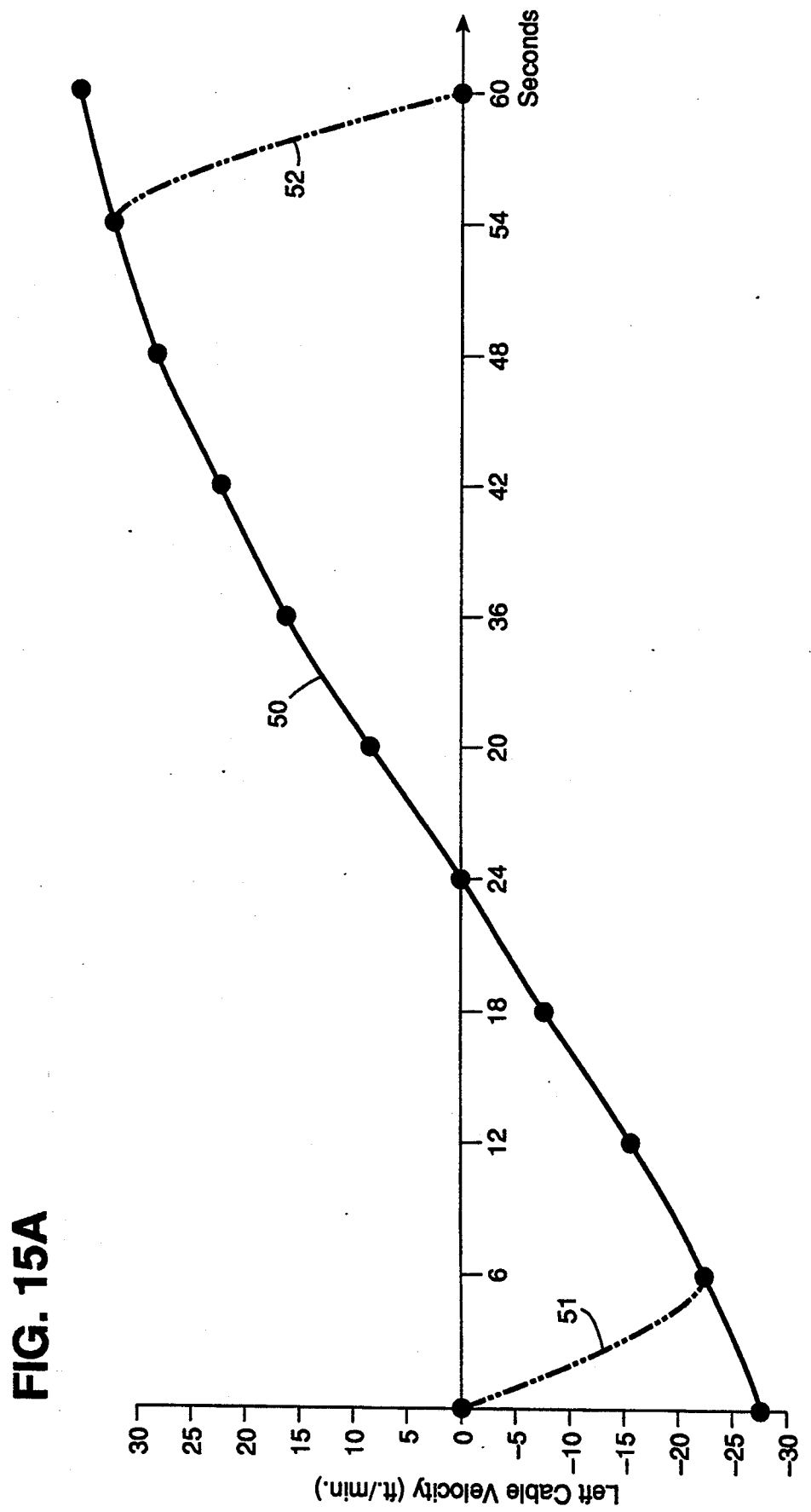
FIG. 15A is a graph showing the relationship between time and left cable velocity for the move shown in FIG. 15.

The relationship between cable velocity and time for this move with a constant work point velocity of 50 ft/min is illustrated in FIG. 15A. At this velocity, the total time of the move is 60 seconds, with the velocity of the work point being 40 ft/min in the x direction ($dx/dt = 40$) and negative 30 ft/min in the y direction ($dy/dt = -30$). As can be seen by curve 50, the cable velocity is negative for the first 24 seconds of the move, indicating cable take up, and is positive for the last 36 seconds, indicating cable release. The point at which the cable velocity is 0 corresponds to the point at which the cable and the work point path are perpendicular.

The graphs of FIGS. 14A and 15A illustrate the ideal case wherein the work point and the cable are able to instantly assume the required velocity from a rest point, and instantly assume a velocity of 0 when moving. In reality, however, these accelerations will not be instantaneous, but will require some small amount of time. Accordingly, the actual velocity curves for the cable at the beginning and end of the moves will approximate those shown by dotted line 51, and by dotted line 48 and 52, respectively.

The programming of such a system will be apparent to all those skilled in the art. To provide further guidance, a copy of the Parasol® II source code used by the inventors in programming their system has been annexed as Appendix A. This code is provided for exemplary purposes only, and is in no way intended to limit the scope of this invention.

In view of the above description, it is apparent that a wide range of practical applications for the above invention are possible. Accordingly, the invention is not limited to the embodiments described, and various modifications can be made thereto without departing from the scope of the invention.

APPENDIX A

```
;****************************************************************
;   Initializing System
;---------------------------------------------------------------
Define initial_val Enable
2 Axset 100000 100 Putgain
```

```
2500 103 Putgain
20 @.linear_vel
1 12 / @.dis_incr
10 @.end_x   10 @.end_y
27.6875 @.l_height 27.292 @.r_height 31 @.span
10 @.start_x  5 @.start_y  6 @.width  -2 @.ver_index  4 @.rows
set_initial
timer_reset
3 @.x_min_p .span 3 - @.x_max_p
3 @.y_min_p .ymax 1 - @.y_max_p
0 @.counter 0 @.painter
1 @.path_table 0 @.pp
0 @.time_start 0 @.time_adj 0 @.time_stop 0 @.timer_total
1 @.y_adj ;(This adjusts the height between the vertex and tool)
;----------------------------------------------------------
;create a dummy pathtable so both axis can be held in position &m_line_lc 6 5 2 2 Arraydef
&m_line_rc 6 5 2 2 Arraydef
5 1 1 For
        10 .counter * .counter 1 + 1 m_line_lc Arrayset
        10 .counter * .counter 1 + 2 m_line_lc Arrayset
        10 .counter * .counter 1 + 1 m_line_rc Arrayset
        10 .counter * .counter 1 + 2 m_line_rc Arrayset
        .counter 1 + @.counter
Loop
;----------------------------------------------------------
;Initialize the I/O
2 Ioset     ; Configure controller for Extended I/O with Exte
            ; nded Analog I/O
0 200 Iodir ; Set address 200 to be input
0 201 Iodir ; Set address 201 to be input End ;*****************************************
;     jogpanel functions
;-----------------------------------------
Define jog_setup ;Read the position of x and y before the controller is initialized
        ;reset position if needed Xaxis Read @.xposition Motoff
        1 Lodgain .xposition Go Yaxis Read @.yposition Motoff
        1 Lodgain .yposition Go
        1

End

;----------------------------------------------------------
;jog the motors into position using the following functions Define l_up_slow Xaxis 16000 Velset End Define l_up_fast Xaxis 48000 Velset End Define l_down_slow Xaxis -16000 Velset End Define l_down_fast Xaxis -48000 Velset End Define r_up_slow Yaxis 16000 Velset End
```

```
Define r_up_fast Yaxis 48000 Velset End

Define r_down_slow Yaxis -16000 Velset End

Define r_down_fast Yaxis -48000 Velset End

Define l_stop Xaxis Stop End

Define r_stop Yaxis Stop End
;------------------------------------------------------------------
;change the controller to 2207 for use with the arbitrary path controller Define load_2207

2 Axset Read Go Axwait
        Xaxis Zero Motoff
        2 Lodgain &m_line_lc Pathtable Pathon Yaxis Zero Motoff
        2 Lodgain &m_line_rc Pathtable Pathon End ;*****************************************************************
; Set the initial conditions (homepanel) functions
;------------------------------------------------------------------

Define op_par_time                          ;set the distance increment
                                            ;based on time and velocity
        .linear_vel 60 / .time_incr * @.dis_incr  ;new time entered End
;------------------------------------------------------------------
Define op_par_vel                           ;set the time increment based
                                            ;on distance and velocity
        .dis_incr .linear_vel 60 / / @.time_incr  ;new velocity entered End
;------------------------------------------------------------------
Define op_par_dis                           ;set the time increment based
                                            ;on distance and velocity
        .dis_incr .linear_vel 60 / / @.time_incr  ;new distance entered End
;==================================================================

Define set_initial

;determine the maximum height (2 feet below the lowest cup)

.r_height .l_height <

Iftrue
                .r_height 2 - @.ymax
        Else
                .l_height 2 - @.ymax
        Endif
End
;------------------------------------------------------------------

;*****************************************************************
; General Functions used through out this program
;------------------------------------------------------------------
```

```
;convert feet to encoder counts

Define feet_2_counts 12 4.292 4000 * * *    ;12in/ft * 4.292 rev/in *4000 counts/rev End
;-----------------------------------------------------------
;convert encoder counts to feet Define counts_2_feet
        206016 /
End ;-----------------------------------------------------------
;stop all motors when in 1007 Controller (jog motors)

Define allstop
        Xaxis Stop
        Yaxis Stop
        1
End
;-----------------------------------------------------------
;stop all motors when in 2207 Controller (arbitrary path)

Define stop_abort
        2 Axset Stop
        .actual_x @.start_x    ;determine actual stopped position
        .actual_y @.start_y    ;this position is now new starting point
        0 @.stop
        0 100 Digout           ;sprayer off
        Time @.time_stop       ;determine spray time
        .time_stop .time_start - .time_adj + @.timer_total
        .timer_total 60000 / .timer_total 60000 / 1 % - @.minutes
    1 @.time_valve
        .timer_total 60000 / 1 % 60 * @.seconds
        .time_stop .time_start - .time_adj + @.time_adj
End
;-----------------------------------------------------------
;set encoders to zero and determine starting encoder counts Define set_encoders Xaxis Zero
        .start_x Dup * .l_height .start_y - Dup * + Sqrt @.l_length
        .l_length feet_2_counts @.l_counts_st Yaxis Zero
        .span .start_x - Dup * .r_height .start_y - Dup * + Sqrt @.r_length
        .r_length feet_2_counts @.r_counts_st End
;-----------------------------------------------------------
; Painter Functions Define paint_on
        1 @.painter
End Define paint_off
        0 @.painter
End Define paint1
```

```
Iftrue
1 @.window_p
Else
0 @.window_p
Endif
0 @.painter
End

Define paint2
Iftrue
1 @.painter
Endif
End

;------------------------------------------------------------
; Reset the Painter On Timer Define timer_reset 0 @.time_adj
        0 @.timer_total
        0 Timeset End
;------------------------------------------------------------
; Check to make sure the distance of the move is not zero Define checkstraight .end_x .start_x ==
        .end_y .start_y ==
        And
        Iftrue
        0 @.stop
        Else
        straight   ; perform the move
        Endif End ;**********************************************************************
;  Straight line function
;--------------------------------------

Define straight

;calculate the total length of move

;calculate the total time the move will take

Repeat
;calculate the total number of points the move is made-up of

Iftrue
        1 @.array_adj
Else
        2 @.array_adj
Endif

;determine if array size is at least 5
Iftrue
1
Else
```

```
0
Endif
Endrpt

;(calculations cannot be performed on an active pathtable)
Iftrue
        &m_line_la 6 .array_length 2 2 Arraydef
        &m_line_ra 6 .array_length 2 2 Arraydef
Else
        &m_line_lb 6 .array_length 2 2 Arraydef
        &m_line_rb 6 .array_length 2 2 Arraydef
Endif set_encoders 0 @.time
1 @.counter
1 @.time_valve
0 @.time_valve2

1 0 For

;calculate new x and y    (note .y_adj is for tool offset)
        ;-----------------------
        .end_x .start_x - .time .total_time / * .start_x + @.x_pos
        .end_y .start_y - .time .total_time / * .start_y + @.y_pos ;calculate encoder positions
        ;----------------------------- Left
        .x_pos Dup * .l_height .y_pos - Dup * + Sqrt @.l_length ;length
        .l_length feet_2_counts  @.l_counts ;calculate counts
        .l_counts .l_counts_st - Chs @.l_counts ;----------------------------- Right
        .span .x_pos - Dup * .r_height .y_pos - Dup * + Sqrt @.r_length
        .r_length feet_2_counts  @.r_counts
        .r_counts .r_counts_st - Chs @.r_counts 100000 .time * @.time_scale       ;multiply time by 100000 to place
                                          ;time in the same range as encoder
                                          ;counts: Velset is set to 100000
                                          ;therefore establishing time as units
                                          ;for phantom axis
;-------------------------------------------------------------
;insert the calculated encoder counts and time into arrays
        .path_table
        Iftrue
                .time_scale .counter 1 m_line_la Arrayset
                .l_counts .counter 2 m_line_la Arrayset .time_scale .counter 1 m_line_ra Arrayset
                .r_counts .counter 2 m_line_ra Arrayset
        Else
                .time_scale .counter 1 m_line_lb Arrayset
                .l_counts .counter 2 m_line_lb Arrayset .time_scale .counter 1 m_line_rb Arrayset
                .r_counts .counter 2 m_line_rb Arrayset
        Endif
         .time .time_incr_i + @.time
         .counter 1 + @.counter Loop ;determine if fractional move has to be completed
```

```
        .array_adj 1 -      ;0 skip, not required
                            ;1 fractional step required Iftrue
        .end_x @.x_pos
        .end_y @.y_pos ;calculate encoder position .x_pos Dup * .l_height .y_pos - Dup * + Sqrt @.l_length
        .l_length  feet_2_counts @.l_counts
        .l_counts .l_counts_st - Chs @.l_counts .span .x_pos - Dup * .r_height .y_pos - Dup * + Sqrt @.r_length
        .r_length  feet_2_counts @.r_counts
        .r_counts .r_counts_st - Chs @.r_counts 100000 .total_time * @.time_scale .path_table
        Iftrue
                .time_scale .counter 1 m_line_la Arrayset
                .l_counts .counter 2 m_line_la Arrayset .time_scale .counter 1 m_line_ra Arrayset
                .r_counts .counter 2 m_line_ra Arrayset
        Else
                .time_scale .counter 1 m_line_lb Arrayset
                .l_counts .counter 2 m_line_lb Arrayset .time_scale .counter 1 m_line_rb Arrayset
                .r_counts .counter 2 m_line_rb Arrayset
        Endif Endif Iftrue
        Enable 2 Axset Read Go
        Xaxis &m_line_la Pathtable Pathon
        Yaxis &m_line_ra Pathtable Pathon
        2 Axset
        0 @.path_table
Else
        Enable 2 Axset Read Go
        Xaxis &m_line_lb Pathtable Pathon
        Yaxis &m_line_rb Pathtable Pathon
        2 Axset
        1 @.path_table
Endif 2 Axset Zero .total_time 100000 * Go ;================================================================
; Routine to monitor painter (ON,OFF), load cell (Tension) and
; actual position of the working tool.
; This routine repeats until the motors reach desired position
Repeat
;----------------------------------------------------------------
; Measure the tension of each cable for display and over-tension limit ;measure left tension
201 Atod
        4095 / .05 *              ;volts for 12 bit A to D
        59134 * @.l_tension       ;Tension in lbs.
```

```
;measure right tension
200 Atod
        4095 / .05 *
        54752 * @.r_tension ;----------------------------------------------------------------
;Calculate the actual X and Y position based on cable lengths Xaxis .l_counts_st Read - counts_2_feet @.l_feet
Yaxis .r_counts_st Read - counts_2_feet @.r_feet ;----------------------------------------------------------------
; Determine if painter should be (ON or OFF)
; The first stage is activated if the painter button is pressed
; The second stage is activated once cruise velocity is reached
; The painter is turned on if in the boundries as set by operator Iftrue
        .pp 1 + @.pp
Endif 2 Axset Axstat 2 ==   ; Check for constant velocity
Iftrue
        .pp 1 + @.pp
Endif Iftrue
        .pp 1 + @.pp
Endif Iftrue
        .pp 1 + @.pp
Endif Iftrue
        .pp 1 + @.pp
Endif Iftrue
        .pp 1 + @.pp
Endif Iftrue              ;If .pp=6 then ok to turn sprayer on
        1 100 Digout
        .time_valve
    Iftrue
        Time @.time_start
            0 @.time_valve 1 @.time_valve2
          Endif
        Time .time_start - .time_adj + @.timer_total
Else
        0 100 Digout
        .time_valve2 Iftrue
                Time @.time_stop
                .time_stop .time_start - .time_adj + @.timer_total
                .time_adj .time_stop .time_start - + @.time_adj
                1 @.time_valve 0 @.time_valve2
          Endif
Endif 0 @.pp
```

```
;----------------------------------------------------------
;Calculate the total time that the sprayer is on ;----------------------------------------------------------
;Determine if the motors come to a complete stop, if so move on 2 Axset
Axstat 9 ==
Iftrue
0
Else
1
Endif
Endrpt
End ;***********************************************************
; Display array a   (For trouble shooting only)

Define disarraya
        1 @.counter
         .array_length 1 1 For
        .counter 1 m_line_la Arrayget 1 9 0 Fout "  " Wstr
        .counter 2 m_line_la Arrayget 1 9 0 Fout "  " Wstr
        .counter 1 m_line_ra Arrayget 1 9 0 Fout "  " Wstr
        .counter 2 m_line_ra Arrayget 1 9 0 Fout "  " Pmsg
        .counter 1 + @.counter
        Loop End ; Display array b  (For trouble shooting only)

Define disarrayb
        1 @.counter
         .array_length 1 1 For
        .counter 1 m_line_lb Arrayget 1 9 0 Fout "  " Wstr
        .counter 2 m_line_lb Arrayget 1 9 0 Fout "  " Wstr
        .counter 1 m_line_rb Arrayget 1 9 0 Fout "  " Wstr
        .counter 2 m_line_rb Arrayget 1 9 0 Fout "  " Pmsg
        .counter 1 + @.counter
        Loop End ;***********************************************************
;   Raster Functions
;----------------------------------------------------------

Define raster
        1 @.stop
        -1 @.points
        .rows 1 1 For            ;determine the matrix size
                .points 2 + @.points   ;(number of points)
        Loop &m_raster 7 .points 2 2 Arraydef .start_y @.ypoint
        1 @.counter
        1 @.odd_even .points 1 - 2 / @.loops
        .loops 1 1 For     ;Build array of points
```

```
                        horizontal
                        vertical

Loop horizontal

1 @.counterr
            .points 1 1 For                ;Make the move
                    .counterr 1 m_raster Arrayget @.end_x
                    .counterr 2 m_raster Arrayget @.end_y
                    .counterr 1 + @.counterr .stop Iftrue
                            checkstraight ; perform the straight_line function with
                    Endif          ; new end points Loop End
;------------------------------------------------------------------
;Horizontal movement (left or right)

Define horizontal

.odd_even 2 / @.comm1        ;determine if moving left or right using
        .comm1 .comm1 1 % - @.comm2  ;using odd or even numbers (.counter)
        .comm1 .comm2 ==             ;if odd, not equal, 0 on stack; move right
                                     ;if even, equal, 1 on stack; move left
        Iftrue
                .start_x @.xpoint             ; move left
        Else
                .start_x .width + @.xpoint    ; move right
        Endif .xpoint .counter 1 m_raster Arrayset
        .ypoint .counter 2 m_raster Arrayset .counter 1 + @.counter
        .odd_even 1 + @.odd_even End
;------------------------------------------------------------------
;Vertical movement (up is positive .ver_index)

Define vertical

.ypoint .ver_index + @.ypoint       ;subtract the vertical index
                                            ;for a vertical move
        .xpoint .counter 1 m_raster Arrayset
        .ypoint .counter 2 m_raster Arrayset .counter 1 + @.counter End ;------------------------------------------------------------------
; Display the raster array ( for testing purposes only)

Define disarrayr
        1 @.counter
                .points 1 1 For
                        .counter 1 m_raster Arrayget 0 1 1 Fout "  " Wstr
                        .counter 2 m_raster Arrayget 0 1 1 Fout "  " Pmsg
```

```
                .counter 1 + @.counter
                Loop

End
;--------------------------------------------------------
;********************************************************
;     Window Function
;--------------------------------------------------------

Define window

; Determine if painter is on or off.
    1 @.stop paint1
        .window_x @.end_x
        .window_y 1 - @.end_y
        checkstraight            ;move to start position A
        paint2

2 Axset 97080 100 Putgain 97080 102 Putgain 0 104 Putgain

.x_min_p @.x_temp_p
    0 @.x_min_p
    .stop Iftrue                         ;move to B
        .window_y .window_h 1 + + @.end_y
        checkstraight
        Endif                                     ; move up
    .x_temp_p @.x_min_p paint1    ;store the value of .painter
    .stop Iftrue                         ;move to C
        .window_x 1 - @.end_x
        .window_y .window_h + @.end_y
        checkstraight
        Endif
        paint2    ;restore the value of .painter .y_max_p @.y_temp_p
    .ymax @.y_max_p
    .stop Iftrue                         ;move to D
        .window_x .window_w 1 + + @.end_x
        .window_y .window_h + @.end_y
        checkstraight
        Endif
    .y_temp_p @.y_max_p paint1
    .stop Iftrue                         ;move to E
        .window_x .window_w + @.end_x
        .window_y .window_h 1 + + @.end_y
        checkstraight
        Endif
        paint2

.x_max_p @.x_temp_p
    .span @.x_max_p
    .stop Iftrue                         ;move to F
        .window_x .window_w + @.end_x
        .window_y 1 - @.end_y
        checkstraight
        Endif
```

```
        .x_temp_p @.x_max_p paint1
        .stop Iftrue                            ;move to G
        .window_x .window_w 1 + + @.end_x
        .window_y @.end_y
        checkstraight
        Endif
        paint2

.y_min_p @.y_temp_p
        0 @.y_min_p
        .stop Iftrue                            ;move to H
        .window_x 1 - @.end_x
        .window_y @.end_y
        checkstraight
        Endif
        .y_temp_p @.y_min_p 2 Axset 35000 100 Putgain 35000 102 Putgain 500 104 Putgain End ;##############################################################
;Test function for the load cells
;--------------------------------------------

Define loadcell

2 Ioset
        0 200 Iodir
        0 201 Iodir

Repeat

200 Atod
                        4095 / .05 *

59134 * @.l_tension

201 Atod
                        4095 / .05 *
                        54752 * @.r_tension .l_tension 1 6 2 Fout "   " Wstr .r_tension 1 6 2 Fout Pnull Chin !

Endrpt

End
;****************************************************************
; This is the first function executed upon startup of the controller Define startup -1 Scerase          ; erase all screens
        copyright Scdraw    ; draw screen copyright
        &Main Restart       ; link panel job and Parasol II file and execute End startup
```

What is claimed is:

1. A system for moving a work point, the system comprising:

a plurality of reeving systems spaced apart from one another;

a plurality of adjustable support elements, each of said support elements connected to the work point and to a corresponding reeving system to support the work point, the length of each support element between the work point and the respective reeving system determining the location of the work point with respect to at least two different spatial coordinate axes that define a vertical plane;

a plurality of actuators, each of said actuators associated with a corresponding reeving system, for releasing and taking up the support element connected to the corresponding reeving system to move the work point with respect to the at least two different spatial coordinate axes; and a programmable control system for controlling at least one motion parameter of the work point in a predetermined manner by controlling the release and take up of each of said support elements to move the work point with respect to each of the at least two different spatial coordinate axes.

2. A system according to claim 1, wherein said programmable control system controls at least two motion parameters of the work point in a predetermined manner.

3. A system according to claim 1, wherein said programmable control system controls at least one motion parameter on a real time basis through direct operator input.

4. A system according to claim 1, wherein said programmable control system is a computer control system.

5. A system according to claim 4, wherein said programmable control system is programmed to move the work point over a prescribed path.

6. A system according to claim 4, wherein said programmable control system is programmed to move the work point at a prescribed velocity.

7. A system according to claim 4, wherein said programmable control system is programmed to move the work point over a prescribed path at a prescribed velocity.

8. A system according to claim 4, wherein said programmable control system is programmed to move the work point over a prescribed path at a prescribed acceleration.

9. A system according to claim 4, wherein said programmable control system controls at least one motion parameter on a real time basis through direct operator input.

10. A system according to claim 4, wherein each of said actuators is a power driven device.

11. A system according to claim 10, wherein said power driven device is selected from the group consisting of electric motors, hydraulic motors and pneumatic motors.

12. A system according to claim 4, wherein each of said plurality of reeving systems is attached to a wall.

13. A system according to claim 12, wherein each of said plurality of reeving systems is attached to the wall with a vacuum evacuated chamber.

14. A system according to claim 4, wherein each of said plurality of reeving systems is attached to a beam disposed above a wall.

15. A system according to claim 4, wherein each of said plurality of reeving systems is attached to a movable crane.

16. A system according to claim 4, wherein each of said reeving systems is attached to the work point, and wherein each of said support elements is connected at one end to a known point located on a wall.

17. A system according to claim 16, wherein the known point on the wall is the same for each of said plurality of support elements.

18. A system according to claim 4, wherein the work point is a working load operating under the control of said programmable control system.

19. A system according to claim 18, wherein said programmable control system is programmed to move the working load over a prescribed path at a prescribed velocity while simultaneously controlling the operation of the working load.

20. A system according to claim 19, wherein the working load is adapted to perform an automated cleaning operation.

21. A system according to claim 19, wherein the working load is adapted to perform an automated painting operation.

22. A system according to claim 4, wherein each of said adjustable support elements is fed through its corresponding reeving system only once so that said support element has an end that is free from tension due to the work point.

23. A system according to claim 4, wherein said support elements are selected from the group consisting of cables, telescoping cylinders, chains, belts and rack and pinion drive mechanisms.

24. A system for moving a work point, the system comprising:

means for taking up and releasing a plurality of support elements, said plurality of support elements supporting the work point and determining the location of the work point with respect to at least two different spatial coordinate axes that define a vertical plane, to move the work point with respect to each of the at least two different spatial coordinate axes;

programmable control means for controlling at least one motion parameter of the work point in a predetermined manner by controlling the take up and release of each of said support elements to move the work point with respect to each of the at least two different spatial coordinate axes.

25. A method for moving a work point, the method comprising the steps of:

taking up and releasing a plurality of support elements, said support elements supporting the work point and determining the location of the work point with respect to at least two different spatial coordinate axes that define a vertical plane, to move the work point with respect to each of the at least two different spatial coordinate axes; and controlling at least one motion parameter of the work point in a predetermined manner by controlling the take up and release of each of said support elements to move the work point with respect to the at least two different spatial coordinate axes.

* * * * *